US008325170B2

(12) United States Patent
Tanaka et al.

(10) Patent No.: US 8,325,170 B2
(45) Date of Patent: *Dec. 4, 2012

(54) IMAGE DISPLAY DEVICE AND DRIVING METHOD THEREOF

(75) Inventors: Yukio Tanaka, Kanagawa (JP); Munehiro Azami, Kanagawa (JP); Yasushi Kubota, Nara (JP); Hajime Washio, Nara (JP)

(73) Assignees: Semiconductor Energy Laboratory Co., Ltd., Atsugi-shi, Kanagawa-ken (JP); Sharp Kabushiki Kaisha, Osaka-shi (JP)

( * ) Notice: Subject to any disclaimer, the term of this patent is extended or adjusted under 35 U.S.C. 154(b) by 314 days.

This patent is subject to a terminal disclaimer.

(21) Appl. No.: 12/639,049

(22) Filed: Dec. 16, 2009

(65) Prior Publication Data

US 2010/0090994 A1 Apr. 15, 2010

Related U.S. Application Data

(63) Continuation of application No. 10/159,288, filed on Jun. 3, 2002, now Pat. No. 7,663,613.

(30) Foreign Application Priority Data

Jun. 6, 2001 (JP) ................................ 2001-171715

(51) Int. Cl.
*G09G 5/00* (2006.01)
*G06F 3/038* (2006.01)

(52) U.S. Cl. ...................................................... 345/204

(58) Field of Classification Search ............ 345/30–111, 345/204–215

See application file for complete search history.

(56) References Cited

U.S. PATENT DOCUMENTS

| | | | |
|---|---|---|---|
| 5,017,914 | A | 5/1991 | Uchida |
| 5,111,190 | A | 5/1992 | Zenda |
| 5,157,386 | A | 10/1992 | Uchida |
| 5,396,258 | A | 3/1995 | Zenda |
| 5,643,826 | A | 7/1997 | Ohtani |
| 5,831,586 | A | 11/1998 | Hirai |
| 5,870,075 | A | 2/1999 | Yamazaki |

(Continued)

FOREIGN PATENT DOCUMENTS

| | | | |
|---|---|---|---|
| CN | 1246698 | A | 3/2000 |

(Continued)

OTHER PUBLICATIONS

Korean Office Action received in connection with Korean Application No. 2002-0031511 dated Sep. 9, 2008 with English translation (15 pages).

*Primary Examiner* — Srilakshmi K Kumar
(74) *Attorney, Agent, or Firm* — Fish & Richardson P.C.

(57) ABSTRACT

An occupying area of a digital system signal line driver circuit in an image display device is large and this hinders the miniaturization of the display device. A memory circuit and a D/A converter circuit in the signal line driver circuit are commonly used for n ("n" is a natural number equal to or larger than 2) signal lines. One horizontal scanning period is divided into n periods and the memory circuit and the D/A converter circuit each perform processing for different signal lines during each of the divided periods. Thus, all the signal lines can be driven. Therefore, the number of memory circuits and the number of D/A converter circuits in the signal line driver circuit can be reduced to one n-th in a conventional case.

18 Claims, 22 Drawing Sheets

U.S. PATENT DOCUMENTS

| | | | |
|---|---|---|---|
| 5,892,496 | A | 4/1999 | Wakeland |
| 5,923,962 | A | 7/1999 | Ohtani |
| 6,067,066 | A | 5/2000 | Kubota |
| 6,154,189 | A | 11/2000 | Tamura |
| 6,219,286 | B1 | 4/2001 | Fuchigami |
| 6,243,066 | B1 | 6/2001 | Murakami |
| 6,285,042 | B1 | 9/2001 | Ohtani |
| 6,333,729 | B1 | 12/2001 | Ha |
| 6,335,541 | B1 | 1/2002 | Ohtani |
| 6,392,629 | B1 | 5/2002 | Murakami |
| 6,392,631 | B1 | 5/2002 | Bertin |
| 6,515,643 | B1 | 2/2003 | Kamiko |
| 6,577,290 | B2 | 6/2003 | Yeo |
| 6,590,562 | B2 | 7/2003 | Yamazaki et al. |
| 6,611,261 | B1 | 8/2003 | Zhang |
| 6,624,865 | B2 | 9/2003 | Edwards |
| 6,693,616 | B2 | 2/2004 | Koyama |
| 6,702,407 | B2 | 3/2004 | Azami |
| 6,750,835 | B2 | 6/2004 | Azami |
| 6,806,862 | B1 | 10/2004 | Zhang |
| 6,839,045 | B2 | 1/2005 | Ozawa |
| 6,897,884 | B2 | 5/2005 | Tsuge |
| 6,924,785 | B1 | 8/2005 | Kretz |
| 7,301,520 | B2 | 11/2007 | Koyama |
| 2001/0048408 | A1 | 12/2001 | Koyama et al. |
| 2002/0024511 | A1 | 2/2002 | Ozawa |
| 2002/0041267 | A1 | 4/2002 | Jung |
| 2002/0053670 | A1 | 5/2002 | Ohtani |
| 2002/0130881 | A1 | 9/2002 | Kudo |
| 2003/0048238 | A1 | 3/2003 | Tsuge |
| 2004/0174448 | A1 | 9/2004 | Azami |
| 2004/0246210 | A1 | 12/2004 | Azami |
| 2006/0132420 | A1 | 6/2006 | Yoshida |

FOREIGN PATENT DOCUMENTS

| | | | |
|---|---|---|---|
| EP | 0 298 255 | | 1/1989 |
| EP | 0 651 431 | | 5/1995 |
| EP | 0 837 446 | | 4/1998 |
| EP | 0 984 423 | A2 | 3/2000 |
| EP | 0 994 459 | | 4/2000 |
| EP | 1 128 355 | | 8/2001 |
| EP | 1 158 580 | | 11/2001 |
| GB | 2 070 857 | | 9/1981 |
| JP | 61-223791 | | 10/1986 |
| JP | 64-086197 | | 3/1989 |
| JP | 04-322216 | | 11/1992 |
| JP | 06-138851 | | 5/1994 |
| JP | 07-130652 | | 5/1995 |
| JP | 08-234237 | | 9/1996 |
| JP | 09-204161 | | 8/1997 |
| JP | 11-119734 | | 4/1999 |
| JP | 2000-122627 | | 4/2000 |
| JP | 2001-109435 | | 4/2001 |
| JP | 2002-215117 | | 7/2002 |
| KR | 1998-032965 | | 7/1998 |
| KR | 2001-100792 | | 11/2001 |

IMAGE DISPLAY DEVICE AND DRIVING METHOD THEREOF

CROSS-REFERENCE TO RELATED APPLICATIONS

This application is a continuation of U.S. application Ser. No. 10/159,288, filed Jun. 3, 2002, now allowed, which claims the benefit of a foreign priority application filed in Japan as Serial No. 2001-171715 on Jun. 6, 2001, both of which are incorporated by reference.

BACKGROUND OF THE INVENTION

1. Field of the Invention

The present invention relates to a method of driving an image display device to which a digital video signal is input and to an image display device for which the driving method is used. Further, the present invention relates to an electronic device using the image display device.

2. Description of the Related Art

In recent years, research and development of a thin film transistor (TFT) using a polycrystalline silicon film as an active layer has been actively made. The mobility in the TFT using a polycrystalline silicon film is two orders of magnitude higher than that in a TFT using an amorphous silicon film. Thus, even if the gate width of the TFT is reduced for micro-fabrication, a current value enough to operate a circuit can be secured. Therefore, a system-on-panel can be realized in which a pixel portion and a driver circuit thereof in an active matrix flat panel display are integrally formed on the same substrate.

If the system-on-panel is realized, a cost reduction due to reductions in the number of assembly steps and test steps for a display is enabled and miniaturization and high definition of a flat panel display are also enabled.

Incidentally, driver circuits of an image display device include a driver circuit using an analog video signal and a driver circuit using a digital video signal. In the case of the driver circuit using a digital video signal, a digital system broadcast wave can be input to the driver circuit as it is without being converted into an analog signal. The driver circuit can be adaptable to a recent digital broadcast, and thus has a promise.

FIG. 20 shows a general structure of an active matrix liquid crystal display device as a kind of an active matrix image display device driven using a digital video signal. As shown in FIG. 20, the liquid crystal display device comprises a signal line driver circuit 9001, a scanning line driver circuit 9002, a pixel portion 9003, signal lines 9004, scanning lines 9005, pixel TFTs 9006, liquid crystal cells 9007, and the like. Each of the liquid crystal cells 9007 includes a pixel electrode, a counter electrode, and liquid crystal provided between the pixel electrode and the counter electrode.

FIG. 21 shows a detailed structure of the signal line driver circuit 9001. FIG. 22 is a timing chart in the signal line driver circuit shown in FIG. 21. Here, an example of an image display device having k (horizontal)×l (vertical) pixels will be described. In order to make easy description, the case where a digital video signal is 3 bits will be indicated as an example. However, the number of bits in an actual image display device is not limited to 3. Also, it is indicated using a concrete value of k=640 in FIGS. 21 and 22.

A general signal line driver circuit includes mainly a shift register 9100, first and second memory circuit groups 9101 and 9102, and a D/A converter circuit group 9103. The shift register 9100 has a plurality of delay type flip flops (DFF). Also, the first memory circuit group 9101 and the second memory circuit group 9102 have a plurality of first memory circuits and a plurality of second memory circuits, respectively. Note that in FIG. 21, a first latch (LAT1) is used as the first memory circuit and a second latch (LAT2) is used as the second memory circuit. The D/A converter circuit group 9103 includes a plurality of D/A converter circuits (DAC). In the shift register 9100, an output signal pulse is sequentially shifted in accordance with an input clock signal for the signal line driver circuit (S-CLK) and a start pulse for the signal line driver circuit (S-SP). The first memory circuit group 9101 stores digital video signals in succession in synchronization with output signals of the shift register 9100. The second memory circuit group 9102 stores outputs of the first memory circuit group 9101 in synchronization with latch pulses. The D/A converter circuit group 9103 converts output signals of the second memory circuit group 9102 into analog signals.

Hereinafter, more detailed structure and operation of the above signal line driver circuit will be described. The number of stages in DFFs of the above-mentioned shift register 9100 (corresponding to the number of DFFs shown in FIG. 21) becomes k+l because the number of pixels in a horizontal direction is "k". As shown in FIG. 22, each of control signals (SR-001 to SR-640 in FIG. 21) as the output signals of the shift register has a pulse shifted by one cycle of S-CLK. The control signals (SR-001 to SR-640) are directly input to the first latches (LAT1) of the first memory circuit group 9101 or are input thereto through buffers.

The first latches (LAT1) store input digital video signals of 3 bits (D0 to D2) in synchronization with the control signals. When pulses of the control signals output from the shift register 9100 are shifted by the same number of items as the number of pixels "k" of one line, digital video signals corresponding to pixels of one line are stored in the first latches (LAT1). Thus, 3 (the number of bits in a digital video signal)×k (the number of pixels in a horizontal direction) first latches (LAT1) are required.

Next, during a flyback period, the second latches (LAT2) of the second memory circuit group 9102 are operated in response to an input latch pulse (LP) and the digital video signals (L1-001 to L1-640 in FIGS. 21 and 22) which have been stored in the first latches (LAT1) are stored in the second latches (LAT2). Thus, 3×k second latches (LAT2) are similarly required. Note that reference symbols L1-001 to L1-640 are indicated in FIG. 21 by assigning a number to each corresponding pixel independent of the number of bits.

When the flyback period is elapsed and a next horizontal scanning period is started, the shift register 9100 again initiates to operate and outputs control signals. Thus, inputs of digital video signals (D0 to D2) to the first latches (LAT1) are started. On the other hand, the digital video signals (L2-001 to L2-640) which have been stored in the second latches (LAT2) are converted into analog signals by the D/A converter circuits (DAC) of the D/A converter circuit group 9103 and input as analog video signals to respective source signal lines (S1 to S640). When pixel TFTs of the respective pixels are turned on, the analog video signals are written into pixel electrodes of the liquid crystal cells.

By the above operation, the image display device performs image display.

The digital system driver circuit which performs the above operation has a defect that an occupying area is very larger than that in an analog system driver circuit. The digital system has a merit that a signal can be indicated by using only binary states "Hi" and "Lo". However, an enormous amount of data is required and the number of circuit elements is increased for processing the data. Thus, an increase in an occupying area of the driver circuit on a substrate cannot be suppressed and this becomes a large hindrance to miniaturization of an image display device.

Also, recently, an increase in the number of pixels and high definition of a pixel are aimed at with a significant increase in the amount of information to be treated. However, it is expected that the number of circuit elements included in a driver circuit is also increased with the increase in the number of pixels and an area of the driver circuit is increased.

Here, an example of a display resolution generally used in a computer is indicated below using the number of pixels and standard names.

| Number of Pixels | Standard Name |
|---|---|
| 640 × 480 | VGA |
| 800 × 600 | SVGA |
| 1024 × 768 | XGA |
| 1280 × 1024 | SXGA |
| 1600 × 1200 | UXGA |

For example, it is assumed that the number of bits is 8 in the SXGA standard. In this case, when 1280 signal lines are provided in the above-mentioned conventional driver circuit, 10240 (8×1280) first memory circuits and 10240 (8×1280) second memory circuits are required. Also, a high definition television receiver such as a high definition TV (HDTV) becomes widely available and a high definition image is required in not only a computer world but also an audio-visual field. A ground digital broadcast begins in America. Also, Japan moves into the age of a digital broadcast. In a digital broadcast, a standard that the number of pixels is 1920×1080 is strong and prompt miniaturization of the driver circuit is desired.

However, as described above, the occupying area of the signal line driver circuit is large and this hinders the miniaturization of the image display device.

SUMMARY OF THE INVENTION

In order to solve the above-mentioned problem, an object of the present invention is to provide a technique for reducing an occupying area of a signal line driver circuit, which is superior in miniaturization.

According to the present invention, in view of the above problem, a memory circuit and a D/A converter circuit in the signal line driver circuit are commonly used for n (n is a natural number equal to or larger than two) signal lines. One horizontal scanning period is divided into n periods and the memory circuit and the D/A converter circuit each perform processing for different signal lines during each of the divided periods. Thus, video signals can be input to all the signal lines during one horizontal scanning period. Therefore, the number of memory circuits and the number of D/A converter circuits in the signal line driver circuit can be reduced to one n-th in a conventional example.

Further, according to the present invention, an order for inputting video signals to the n signal lines is changed every horizontal scanning period or every plural horizontal scanning periods.

Capacitive coupling is directly or indirectly made for adjacent signal lines. Thus, when a video signal is written into one signal line, a potential held in a signal line adjacent to the one signal line is influenced and changed. In other words, a signal line in which a first video signal is written is influenced by writing to a signal line in which a video signal is written later and thus, is easy to change.

Therefore, when an order for inputting video signals is fixed, only a potential of a specific signal line is always and largely deviated from an ideal value. With respect to a relative gradation representation, a pixel connected with a signal line in which a potential is changed is always different from a pixel connected with another signal line. Thus, vertical stripes parallel to signal lines are visually identified by human eyes.

However, according to the present invention, since a position of a pixel modulated by a write potential in a horizontal direction is changed every predetermined period (concretely, every horizontal scanning period or every plural horizontal scanning period), vertical stripes are hard to be visually identified by human eyes.

Note that an order for signal lines to which video signals are input may be set at random or by a predetermined rule. Also, the order may not be changed every horizontal scanning period and may be changed every two horizontal scanning periods or more horizontal scanning periods. Incidentally, it is most important to set the number of horizontal scanning periods to the extent that vertical stripes are hard to be visually identified by human eyes. When a frame frequency is increased, vertical stripes are hard to view. Thus, it is preferable that the number of horizontal scanning periods for changing the order is set in view of the frame frequency.

DETAILED DESCRIPTION OF THE PREFERRED EMBODIMENTS

Hereinafter, an embodiment mode of the present invention will be described. Here, an example of an image display device in which the number of pixels in a horizontal direction and the number of pixels in a vertical direction are generally set to be "k" and "l", respectively will be described. In this embodiment mode, the case where a digital video signal is 3 bits will be described. However, the present invention is not limited to the case of 3 bits, and can be also applied to the case of 6 bits, 8 bits, or another bits. In the description below, reference symbol "n" is used as a parameter indicating the number of signal lines commonly using one D/A converter circuit. When the number of pixels "k" in the horizontal direction is not a multiple of "n", a new pixel is suitably added. Thus, the number of pixels in the horizontal direction is set to be "k'" as a multiple of "n" larger than "k". In this case, the number of pixels "k'" is preferably defined as new "k". When the added pixel is assumed as a virtual one, there is no problem in actual operation.

Figure 1:
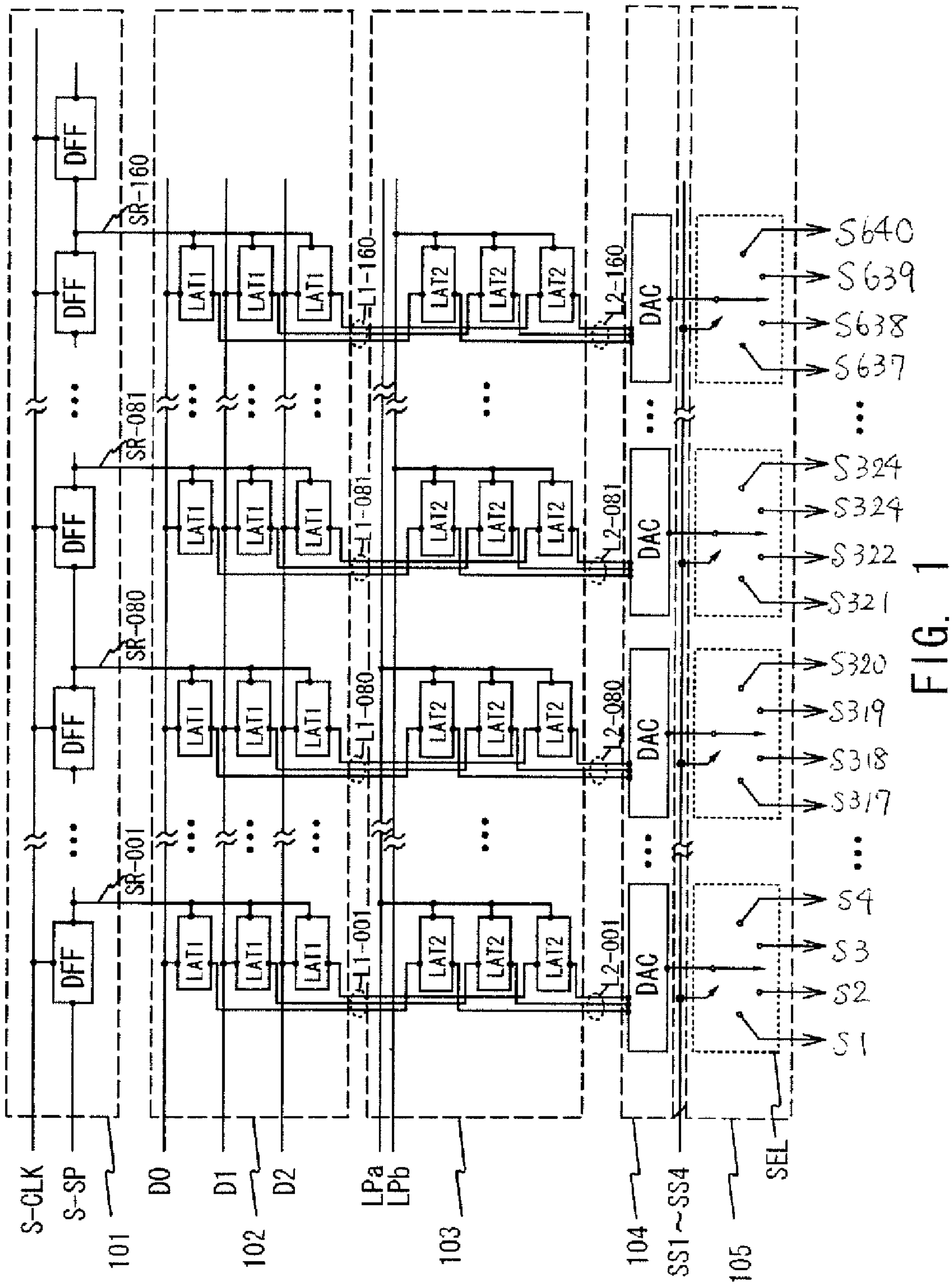
FIG. 1 shows a structure of a signal line driver circuit of the present invention.
Figure 2:
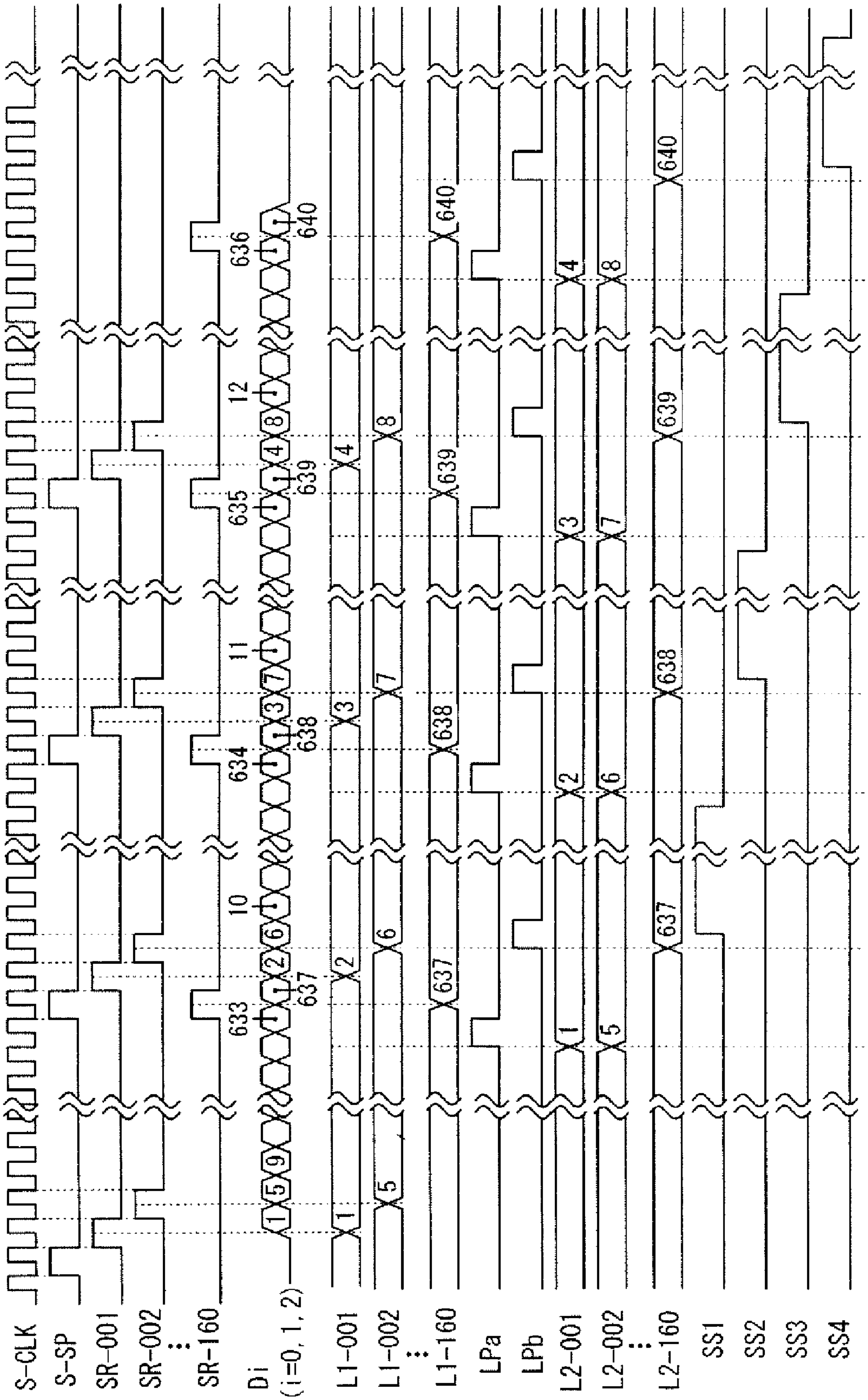
FIG. 2 is a timing chart of the signal line driver circuit of the present invention.

FIG. 1 shows a structure of a signal line driver circuit of this embodiment mode and FIG. 2 shows its timing chart. Note that a concrete example in the case where the number of pixels "k" in the horizontal direction is 640 is indicated in FIGS. 1 and 2. Hereinafter, although symbols such as "k" are used for general description, concrete numerals in the case of k=640 are indicated inside the brackets [ ]. Also, the case of n=4 is indicated in FIG. 1. However, when "n" is a natural number equal to or larger than 2, it is not limited to such a number.

The signal line driver circuit of this embodiment mode includes a shift register 101 having a plurality of delay type flip flops (DFF), a first memory circuit group 102 having a plurality of first memory circuits, a second memory circuit group 103 having a plurality of second memory circuits, a D/A converter circuit group 104 having a plurality of D/A converter circuits (DAC), and a signal line selection circuit group 105 having a plurality of signal line selection circuits (SEL). Note that in FIG. 1, a first latch (LAT1) is used as the first memory circuit and a second latch (LAT2) is used as the second memory circuit. The signal line driver circuit shown in FIG. 1 is different from that shown in FIG. 21. That is, two kinds of latch signal lines (LPa and LPb) are provided, the first latch signal line (LPa) is connected with the first group of the second memory circuits (LAT2 corresponding to the DFFs of 1st to 80th [1st to (k/2n)-th] stages), and the second latch signal line (LPb) is connected with the second group thereof (LAT2 corresponding to the DFFs of 81th to 160th [(1+(k/2 n))-th to (k/n)-th] stages). In the present invention, one latch signal line may be provided.

Concretely, in FIG. 1, the signal line driver circuit comprises the shift register 101 having (k/n)+1 stage [161-stage] DFFs, 3k/n [480] first memory circuits (LAT1). 3k/n [480] second memory circuits (LAT2), and k/n [160] D/A converter circuits (DAC). As can be seen from FIG. 1, the number of circuits composing the signal line driver circuit is reduced to about one n-th [one fourth] as compared with the signal line driver circuit shown in FIG. 21.

Figure 22:
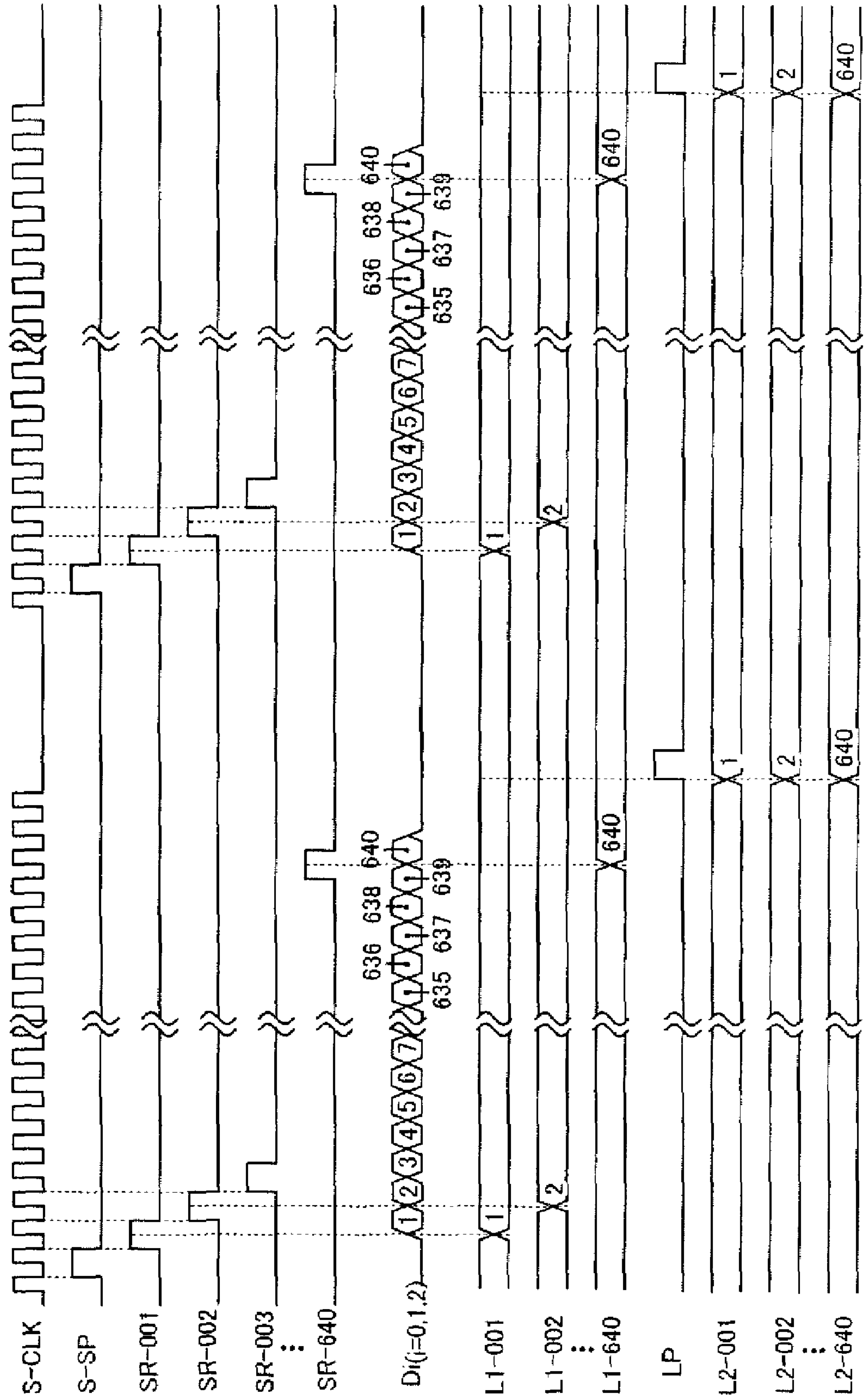
FIG. 22 is a timing chart of the conventional digital system signal line driver circuit.

Next, the operation will be described with reference to FIG. 2. A start pulse (S-SP) for the signal line driver circuit and a clock signal (S-CLK) for the signal line driver circuit are input to the shift register 101. In the case of FIG. 22, the pulse of S-SP is produced one time during one horizontal scanning period. On the other hand, it is produced n times [4 times] in this embodiment mode. As in the case of FIG. 22, the shift register 101 shifts pulses of output signals in succession in accordance with the input pulses S-SP and S-CLK. The output signals are input as control signals (SR-001 to SR-160) to the first memory circuits (LAT1).

Digital video signals (D0 to D2) are stored in succession in the first memory circuits (LAT1) in synchronization with the pulses of the control signals output from the shift register 101. The number of stages of the DFFs is reduced to about one n-th [one fourth] as compared with the case of FIG. 21. In the present invention, the first memory circuits perform storage operation n times [4 times] during one horizontal scanning period. Note that digital video signals L1-001 to L1-160 input from the first memory circuit group 102 to the second memory circuit group 103 are indicated in FIG. 1 by assigning a number to each corresponding signal line independent of the number of bits.

Figure 21:
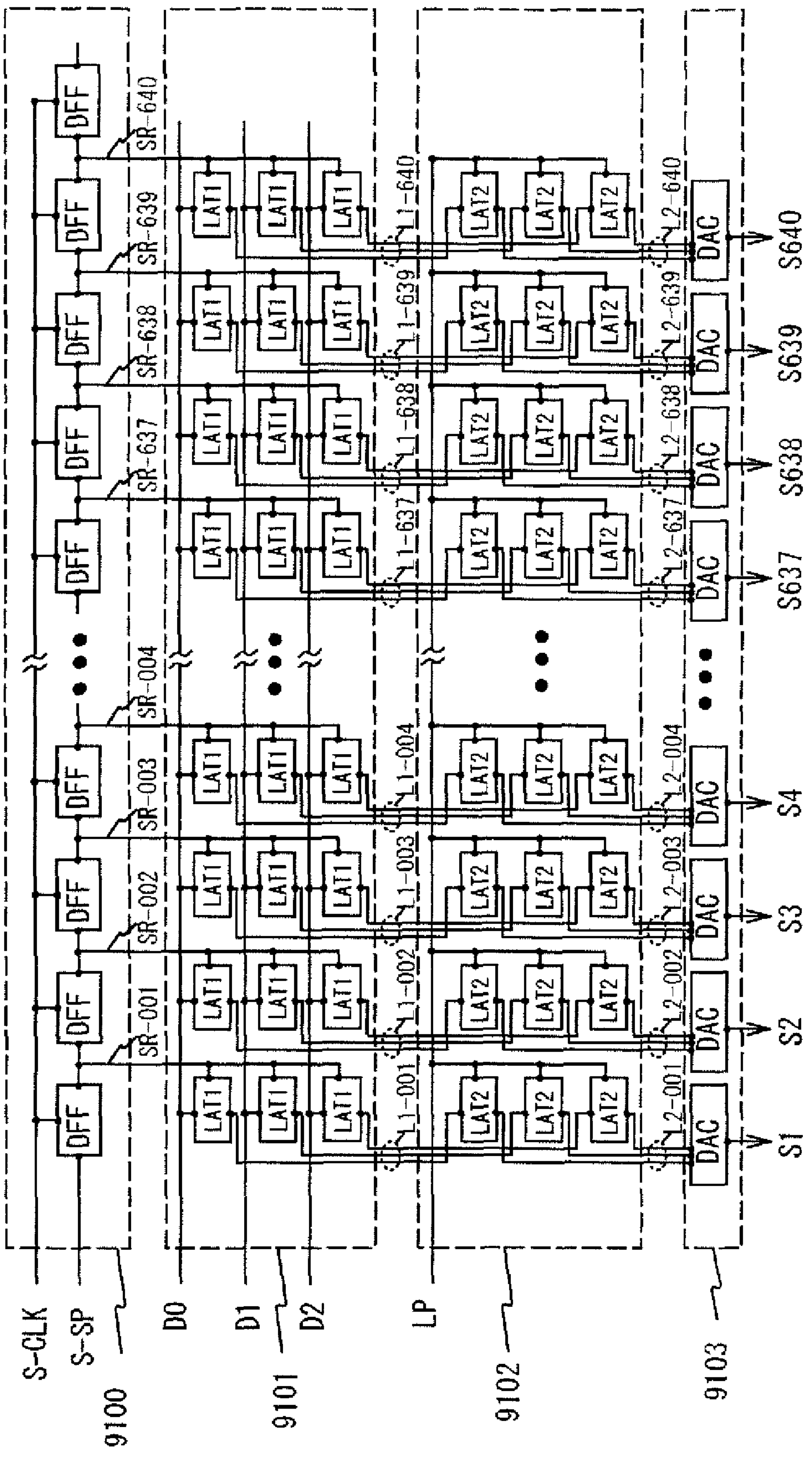
FIG. 21 shows a structure of a conventional digital system signal line driver circuit.

This embodiment mode is different from the case of FIG. 21. The respective digital video signals L1-001 to L1-160 correspond to n signal lines. For example, in the case of FIG. 2, the digital video signal L1-001 corresponds to signal lines S1 to Sn [S1 to S4]. Similarly, when indicated by numbers of corresponding signal lines, the respective digital video signals L1-001 to L1-160 correspond to S1 to Sn, Sn+1 to S2*n*, S2*n*+1 to S3*n*, . . . , Sk-n+1 to Sk [S1 to S4, S5 to S8, S9 to S12, . . . , S637 to S640] in order.

The digital video signals L1-*i* (i=1 to 160) output information on corresponding n signal lines during one horizontal scanning period. However, an order for the corresponding signal lines is not necessarily fixed. According to the present invention, an order for outputting the digital video signals L1-*i* (i=1 to 160) to signal lines is changed every horizontal scanning period. In other words, the order for signal lines corresponding to each of the digital video signals L1-001 to L1-160 is changed every horizontal scanning period. This order is realized by conversion of a data list of the digital video signals (D0 to D2) so as to coincide with a selection order for the signal lines of the signal line selection circuit described later.

With respect to latch pulses input to the second memory circuit group 103 through two kinds of latch signal lines (LPa and LPb) during one horizontal scanning period, n pulses in each, 2n [8] pulses in total are produced. The latch pulses are input during not only a flyback period but also a digital video signal input period.

In this embodiment mode, when writing of the preceding digital video signals corresponding to the signal lines into the first memory circuits (LAT1) of (k/2n)-th stage [80th stage] is completed, the latch pulse is input to the first latch signal line (LPa) before data written into the first memory circuits (LAT1) of the 1st stage is exchanged for the following digital video signals corresponding to signal lines. Also, when writing of the preceding digital video signals corresponding to the signal lines into the first memory circuits (LAT1) of (k/n)-th stage [160th stage] is completed, the latch pulse is input to the second latch signal line (LPb) before data written into the first memory circuits (LAT1) of ((k/2n)+1)-th stage [81th stage] is exchanged for the following digital video signals corresponding to signal lines.

In other words, when writing of the digital video signals into the first group of the first memory circuits is completed, writing of the digital video signals into the second group of the first memory circuits is started. During writing of the digital video signals into the second group of the first memory circuits, the digital video signals written into the first group of the first memory circuits are transferred to the first group of the second memory circuits. When writing of the digital video signals into the second group of the first memory circuits is completed, writing of the following digital video signals into the first group of the first memory circuits is started. During writing of the digital video signals into the first group of the first memory circuits, the digital video signals written into the second group of the first memory circuits are transferred to the second group of the second memory circuits.

By the above operation, the digital video signals corresponding to the respective signal lines are transferred to the second memory circuit group 103 in succession.

Note that the example in which the two latch pulse lines are provided and the latch pulse is input 2n times [8 times] during one horizontal scanning period is indicated in FIG. 1. However, the present invention is not limited to such a structure. All the second memory circuits (LAT2) may be connected with a single latch pulse line. In this case, it is necessary to provide a flyback period after each one-time scanning of the shift register 101 so that writing of the digital video signals into the first memory circuits is stopped during the flyback period. Data transfer from all the first memory circuits (LAT1) to all the second memory circuits (LAT2) is performed during the flyback period. The latch pulse is input n times [4 times] during one horizontal scanning period.

The digital video signal of 3 bits output from the second memory circuits (LAT2) is input to the D/A converter circuit (DAC) and converted into an analog video signal. Note that a buffer circuit, a level shifter circuit, an enable circuit for limiting an output period, and the like may be inserted between the second memory circuits and the D/A converter circuit. The converted analog video signal is written into a suitable signal line through the signal line selection circuit (SEL) of the signal line selection circuit group 105.

Timing for writing the analog video signal into the suitable signal line by the signal line selection circuit (SEL) is determined by timing for inputting the latch pulse. The shift register performs scanning n times during one horizontal scanning period. In correspondence with this, the second memory circuits also repeat storage operation n times as described above. Thus, while a digital video signal corresponding to a certain signal line is stored in the second memory circuits, it is required that a signal line corresponding to an analog video signal output from the D/A converter circuit (DAC) selected to complete writing.

The analog video signal is input from the signal line selection circuit (SEL) to the signal line in synchronization with a pulse of a selection signal input to the signal line selection circuit (SEL). The pulse of the selection signal is produced n times during one horizontal scanning period.

Note that in the present invention, an order for n signal lines to which analog video signals are input is changed every horizontal scanning period or every plural horizontal scanning period. The selection order for the signal lines is controlled by selection signals SS1 to SSn [SS1 to SS4] input to the signal line selection circuit (SEL).

The order for signal lines to which analog video signals are input may be set at random or by a predetermined rule. Also, the order may not be changed every horizontal scanning period and may be changed every two horizontal scanning periods or more horizontal scanning periods. For example, the order may be changed every frame period. Incidentally, it is most important to set the number of horizontal scanning periods to the extent that vertical stripes are hard to be visually identified by human eyes. When a frame frequency is increased, vertical stripes are hard to view. Thus, it is preferable that the number of horizontal scanning periods for changing the order is set in view of the frame frequency.

Table 1 indicates the selection order for signal lines in this embodiment mode.

TABLE 1

| Si | S(i + 1) | S(i + 2) | S(i + 3) |
|---|---|---|---|
| 1 | 2 | 3 | 4 |
| 4 | 3 | 2 | 1 |
| 1 | 2 | 3 | 4 |
| 4 | 3 | 2 | 1 |
| . | . | . | . |
| . | . | . | . |
| . | . | . | . |

Figure 3A:
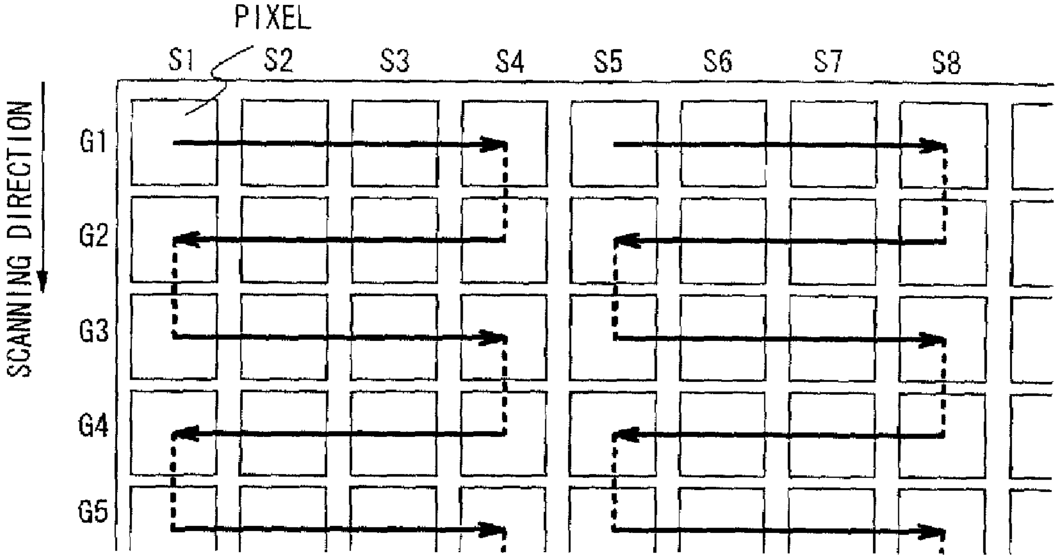
FIGS. 3A and 3B are schematic diagrams indicating orders for inputting analog video signals into pixels.
Figure 3B:
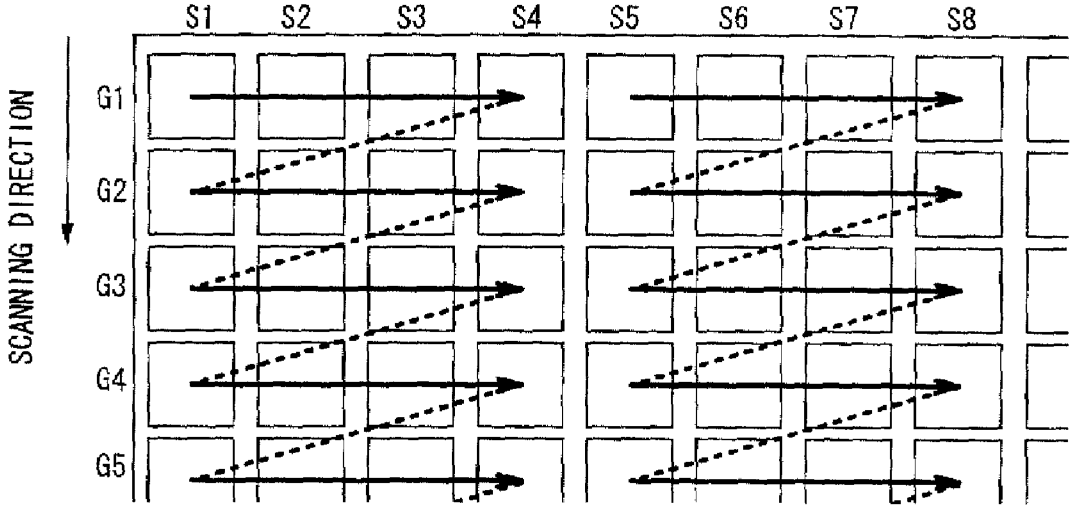

When the signal lines are selected by the order indicated in Table 1, an order for writing analog video signals into pixels is schematically shown in FIG. 3A. Note that, in order to make the comparison, a general order for writing analog video signals into pixels is schematically shown in FIG. 3B.

As shown in FIG. 3A, when the signal lines are selected by the order indicated in Table 1, a first signal line into which an analog video signal is written is changed every horizontal scanning period. On the other hand, as shown in FIG. 3B, when a selection order for the signal lines is fixed, a first analog video signal is always written into the same signal line during each horizontal scanning period.

Thus, in the driving method indicated in Table 1, even if a potential of the first signal line into which a video signal is written is changed, since a position of a pixel into which a modulated potential is written in a horizontal direction is changed every horizontal scanning period, vertical stripes are hard to be visually identified by human eyes. Note that the first signal line into which the analog video signal is written may be changed every plural horizontal scanning periods in the driving example shown in FIG. 3A.

Note that the selection order for the signal lines according to the present invention is not limited to the order indicated in Table 1. As indicated in Table 1, the order may be set by a predetermined rule or at random. Table 2 indicates an example of a selection order for signal lines according to the present invention, which is different from Table 1.

TABLE 2

| Si | S(i + 1) | S(i + 2) | S(i + 3) |
|---|---|---|---|
| 1 | 3 | 2 | 4 |
| 4 | 1 | 3 | 2 |
| 2 | 4 | 1 | 3 |
| 3 | 2 | 4 | 1 |
| . | . | . | . |
| . | . | . | . |
| . | . | . | . |

In the case of Table 2, differently from Table 1, a number of the firstly selected signal line is changed every horizontal scanning period, and all signal lines are firstly selected during any horizontal scanning period without exception. In the above structure, a period for first selection is provided for all the signal lines. Thus, as compared with the driving method indicated in Table 1, even with the same frame frequency, vertical stripes are harder to be visually identified.

Also, the selection order for the signal lines may be changed every horizontal scanning period or every plural horizontal scanning periods, and the selection order for the signal lines may be changed every frame period. For example, the signal lines may be selected by the order indicated in Table 1 during the preceding frame period and selected by the order indicted in Table 2 during the next produced frame period. With such a structure, as compared with the driving method in which the order is merely changed every horizontal scanning period, even with the same frame frequency, vertical stripes are harder to be visually identified.

Note that the example of the signal line driver circuit to which the digital video signal is input and which outputs the analog video signal corresponding to each signal line (so-called digital signal line driver circuit) is indicated in the embodiment mode of the present invention. However, the present invention is not limited to this. For example, a signal line driver circuit to which an analog video signal is input and which outputs an analog video signal corresponding to each signal line (so-called analog signal line driver circuit) may be used.

According to the present invention, the number of circuit elements in the signal line driver circuit can be reduced to one n-th in a conventional example with the above structure. Also, since a position of a pixel having a different gradation in a horizontal direction is changed, even if the frame frequency is not changed, vertical stripes are hard to be visually identified by human eyes.

Also, according to the description of the above embodiment mode, the shift register is used as the circuit for controlling the first memory circuits. However, not the shift register but a decoder circuit may be used. Also, a ramp type D/A converter circuit may be used as the D/A converter circuit. In this case, the number of D/A converter circuits is not limited to k/n.

EMBODIMENTS

Hereinafter, embodiments of the present invention will be described.

Embodiment 1

In this embodiment, a detailed structure of a signal line selection circuit used in an image display device of the present invention will be described.

Figure 4A:
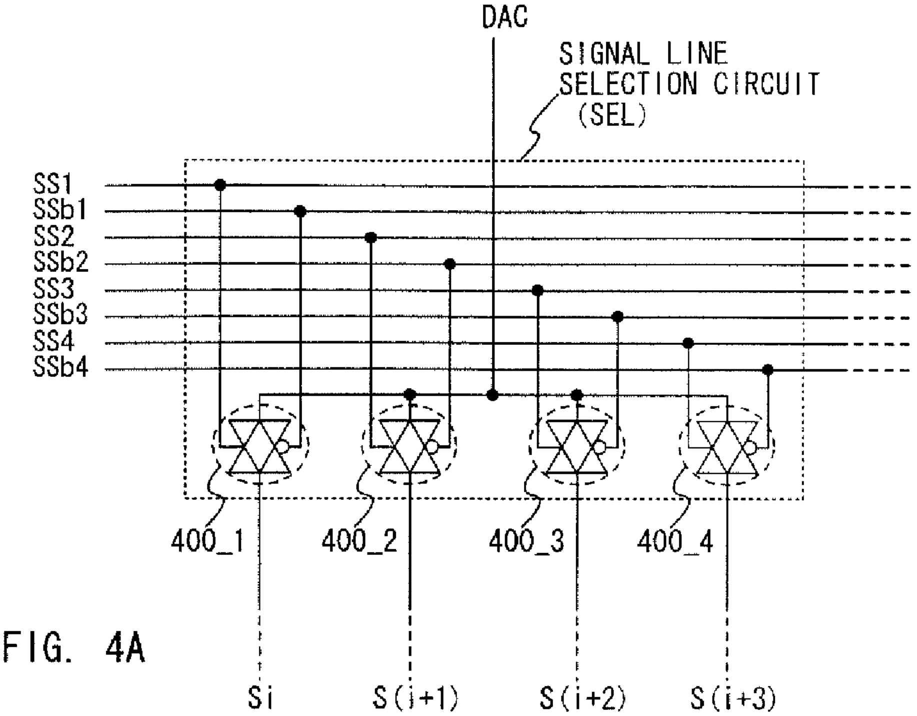
FIGS. 4A and 4B are a circuit diagram of a signal line selection circuit and a timing chart thereof.

FIG. 4A is a circuit diagram of a signal line selection circuit (SEL) of this embodiment. Note that, in this embodiment, "n" is used as a parameter indicating the number of the signal lines commonly using one D/A converter circuit. Incidentally, in order to make easy description in FIGS. 4A and 4B, the case where one DAC corresponds to 4 signal lines is indicated. Hereinafter, "n" is used for general description and concrete numerals in the case of n=4 are indicated inside the brackets [ ].

In this embodiment, an analog switch includes a p-channel transistor and an n-channel transistor. However, the present invention is not limited to this. An analog switch using only a p-channel transistor may be used or an analog switch using only an n-channel transistor may be used.

The signal line selection circuit (SEL) includes n [4] analog switches 400_1 to 400_*n* [400_1 to 400_4]. Selection signals for controlling switching are input to the respective analog switches.

The selection signals for controlling switching are input to the analog switches 400_1 to 400_*n* [400_1 to 400_4] through selection signal lines. The selection signals having different potentials are input to the respective analog switches and the selection signal lines are provided for the respective analog switches.

In this embodiment, the analog switch includes the p-channel transistor and the n-channel transistor. A signal obtained by reversing the polarity of the selection signal is also input to the analog switch. Thus, in this embodiment, selection signals SS1 to SSn [SS1 to SS4] and signals obtained by reversing the polarity of the respective selection signals SSb1 to SSbn [SSb1 to SSb4] are input to the respective analog switches. Note that the signal obtained by reversing the polarity of the selection signal is also called the selection signal in this embodiment.

Figure 4B:
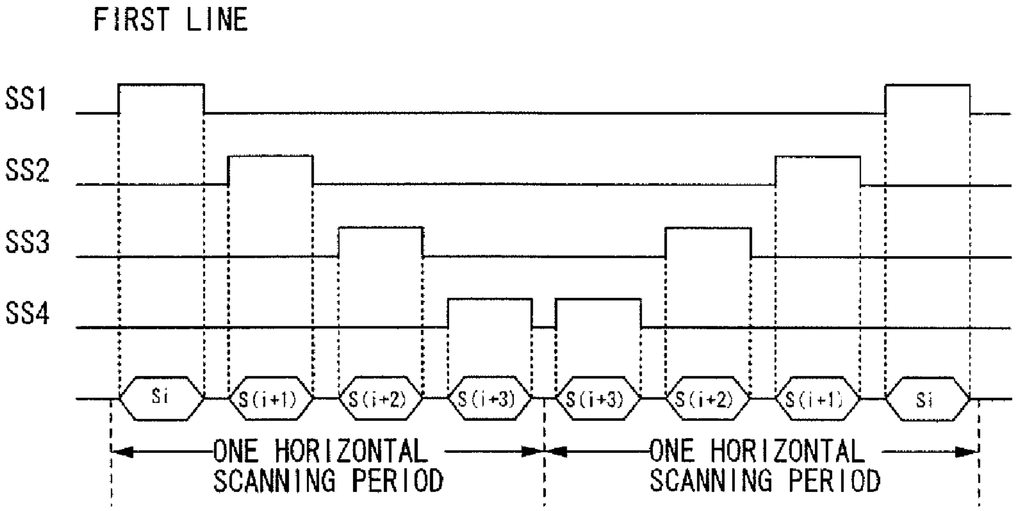

FIG. 4B is a timing chart of the selection signals in the case where signal lines Si to S(i+n−1) [S(i+3)] are selected. Note that since the selection signals SSb1 to SSb4 are obtained by only reversing the polarity of the selection signals SS1 to SS4, only the selection signals SS1 to SS4 are indicated here.

In FIG. 4B, an example in which n [4] signal lines Si, S(i+1), S(i+2), and S(i+n−1) [S(i+3)] connected with the same DAC are selected with the order indicated in Table 1 is indicated. Note that the selection order for the signal lines according to this embodiment is not limited to the order indicated in Table 1.

First, when a horizontal scanning period is started, the signal line Si is selected in synchronization with pulses of the selection signals SS1 and SSb1. Then, an analog video signal output from the DAC is input to the signal line S1 through the analog switch 400_1.

Then, similarly, the signal lines S(i+1) to S(i+n−1) [S(i+3)] are selected in order in synchronization with pulses of the selection signals SS2 to SSn [SS2 to SS4] and SSb2 to SSbn [SSb2 to SSb4]. Then, an analog video signal output from the DAC is input to the signal lines S(i+1) to S(i+3) through the analog switches 400_2 to 400_4 [400_*n]*.

When one horizontal scanning period is elapsed and the next horizontal scanning period is started, the signal line S(i+n−1) [S(i+3)] is selected in synchronization with pulses of the selection signals SSn and SSbn [SS4 and SSb4]. Then, an analog video signal output from the DAC is input to the signal line S(i+n−1) [S(i+3)] through the analog switch 400_*n* [400_4].

Then, similarly, the signal lines S(i+n−2) to Si [S(i+2) to Si] are selected in order in synchronization with pulses of the selection signals SS(n−1) to SS1 [SS3 to SS1] and SSb(n−1) to SSb1 [SS(n−1) to SS1]. Then, an analog video signal output from the DAC is input to the signal lines S(i+2) to Si through the analog switches 400_(n−1) [400_3] to 400_1.

As described above, the selection order for the signal lines can be controlled by the selection signals.

Embodiment 2

In this embodiment, a structure of a controller for generating various signals with respect to driving in an image display device of the present invention will be described.

Figure 5:
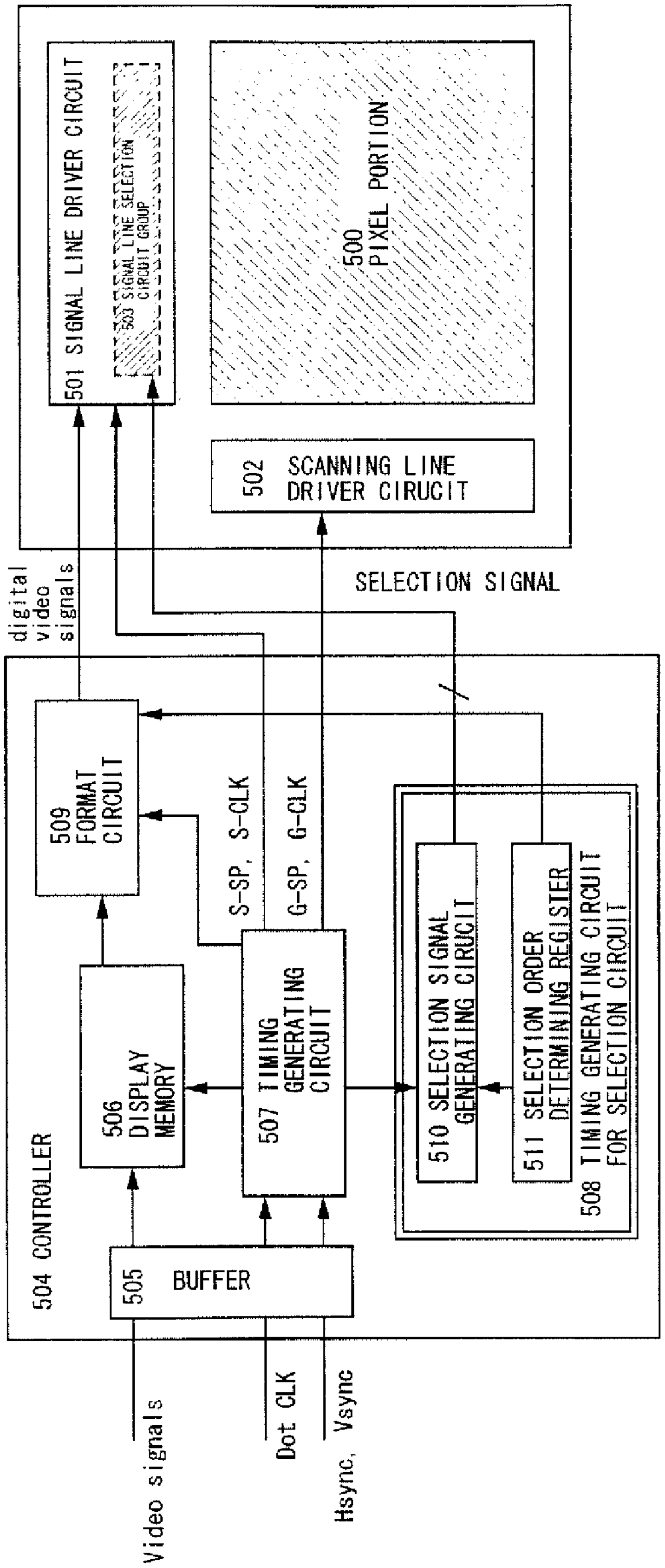
FIG. 5 is a block diagram of an image display device of the present invention.

FIG. 5 is a block diagram indicating a structure of an image display device of this embodiment. Reference numeral 500 denotes a pixel portion, 501 denotes a signal line driver circuit, and 502 denotes a scanning line driver circuit. Reference numeral 503 denotes a signal line selection circuit group, which is included in the is signal line driver circuit 501.

Reference numeral 504 denotes a controller including various circuits. Concretely, the controller mainly includes a buffer 505, a display memory 506, a timing generating circuit 507, a timing generating circuit 508 for a selection circuit, and a format circuit 509. Note that, in addition, the controller may include a bias voltage generating circuit, a serial interface and the like.

Video signals, a standard clock signal (Dot CLK), a horizontal synchronizing signal (Hsync), and a vertical synchronizing signal (Vsync) are mainly input to the controller 504.

The video signals are amplified or buffer-amplified by the buffer 505 and written into the display memory 506. Note that the video signals are not necessarily amplified or buffer-amplified by the butter 505. It is not essential to provide the buffer 505.

Also, the standard clock signal (Dot CLK), the horizontal synchronizing signal (Hsync), and the vertical synchronizing signal (Vsync) are input to the timing generating circuit 507. Note that the standard clock signal is input from the outside of the image display device in this embodiment. However, this embodiment is not limited to this structure. The standard clock signal may be generated from the horizontal synchronizing signal (Hsync) input to the image display device without being input from the outside.

In the timing generating circuit 507, signals for determining timing of operations of various circuits are generated in accordance with the standard clock signal, the horizontal synchronizing signal (Hsync), and the vertical synchronizing signal (Vsync), which are input.

Concretely, a clock signal (S-CLK) and a start pulse signal (S-SP) for the signal line driver circuit 501 and a clock signal (G-CLK) and a start pulse signal (G-SP) for the scanning line driver circuit 502 are generated in the timing generating circuit 507.

Further, timing for writing the video signals into the display memory 506 and timing for inputting the video signals held in the display memory 506 to the format circuit 509 are determined by the timing generating circuit 507.

Timing for selecting the signal lines in the signal line selection circuit group 503 is determined by the timing generating circuit 507. Note that since n signal lines are selected during each horizontal scanning period, timing for selecting the signal lines is produced n times during each horizontal scanning period. Here, "n" indicates the number of signal lines commonly using one DAC. A signal for determining timing for selecting the signal line is input from the timing generating circuit 507 to the timing generating circuit 508 for the selection circuit.

The timing generating circuit 508 for the selection circuit includes a selection signal generating circuit 510 for generating selection signals and a selection order determining register 511 in which data of a selection order for the signal lines is stored. A signal for determining timing for selecting the signal lines is input from the timing generating circuit 507 to the selection signal generating circuit 510. Also, data of a selection order for the signal lines is input from the selection order determining register 511 to the selection signal generating circuit 510.

The selection signal generating circuit 510 generates selection signals SS1 to SSn from the data of the selection order for the signal lines and the signal for determining timing for selecting the signal line which is produced n times. With respect to the respective selection signals SS1 to SSn, a pulse is produced one time during one horizontal scanning period. The signal line is selected in synchronization with the pulse.

On the other hand, the data of the selection order for the signal lines, which is stored in the selection order determining register 511 is also transmitted to the format circuit 509. Then, the video signal input to the format circuit 509 is sorted in accordance with the data of the selection order for the signal lines and input to a first memory circuit group (not shown) of the signal line driver circuit 501. Note that the video signal may be divided into plural signals by serial-parallel conversion in the format circuit 509 and then input to the first memory circuit group (not shown).

Note that the timing generating circuit 507 and the timing generating circuit 508 for the selection circuit are separately indicated in FIG. 5. However, the timing generating circuit 508 for the selection circuit may be assumed to be a portion of the timing generating circuit 507. Also, the display memory 506 is indicated as a portion of the controller 504 in FIG. 5. However, the display memory 506 may be separated from the controller 504.

Also, in FIG. 5, the display memory is connected only with the controller 504 and independent of a system bus controlled by a CPU (not shown). However, this embodiment is not limited to this structure. The CPU and the controller 504 may commonly use the same display memory.

The data of the selection order for the signal lines, which is stored in the selection order determining register 511 may be fixed data determined by a design of a mask and the like or may be data rewritable by a CPU, a dip switch, or the like.

The structure of this embodiment can be embodied by being freely combined with that of Embodiment 1.

Embodiment 3

In this embodiment, concrete structures of first and second memory circuits used in the signal line driver circuit of the present invention will be described.

Figure 6A:
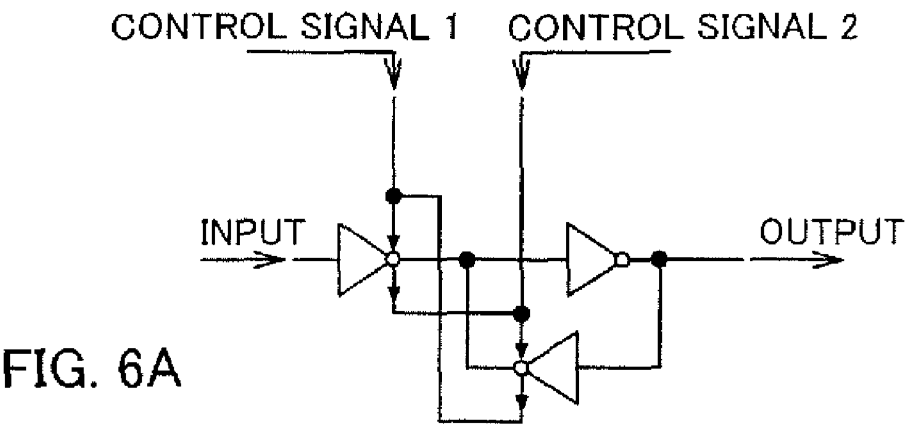
FIGS. 6A to 6C show concrete examples of a memory circuit.
Figure 6B:
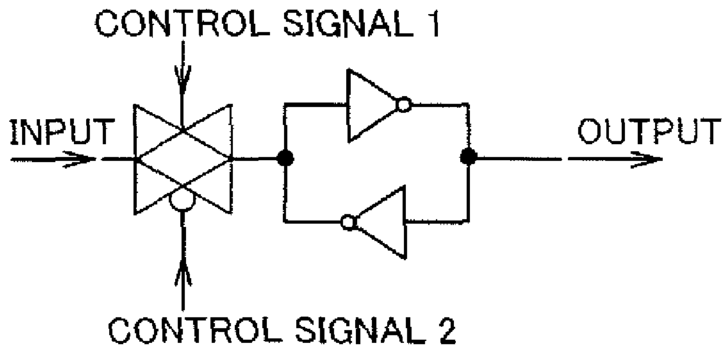
Figure 6C:
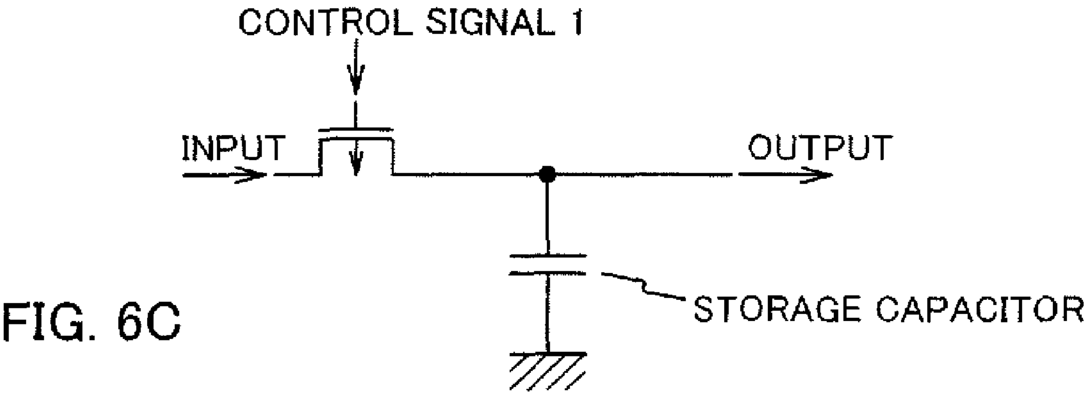

FIGS. 6A to 6C show concrete examples of a memory circuit. FIG. 6A shows a memory circuit using a clocked inverter, FIG. 6B shows an SRAM type memory circuit, and FIG. 6C shows a DRAM type memory circuit. These are typical examples and the present invention is not limited to these types.

Note that a control signal 2 corresponds to a signal obtained by reversing the polarity of a control signal 1. Also, in the case of the second memory circuit, a latch pulse is input as a control signal.

The structure of this embodiment can be embodied by being freely combined with that of Embodiment 1 or 2.

Embodiment 4

In this embodiment, a structure of a signal line driver circuit in the case where a ramp type D/A converter circuit is used as a D/A converter circuit will be described.

Figure 7:
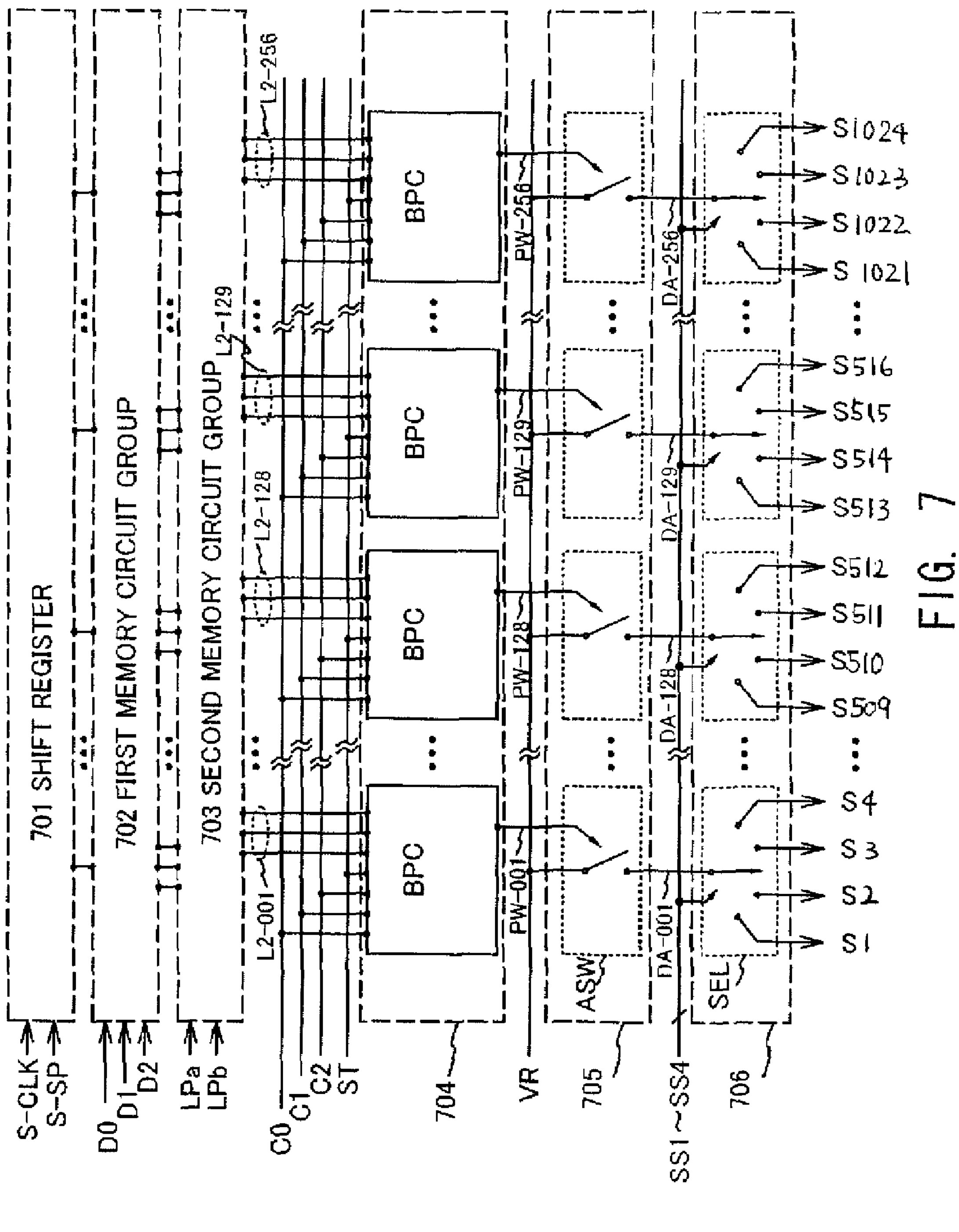
FIG. 7 shows a structure of a signal line driver circuit of the present invention.

FIG. 7 is a schematic view of the signal line driver circuit in the case where the ramp type D/A converter circuit is used. Note that the case where a digital video signal of 3 bits is supported by an XGA standard image display device will be described in this embodiment. However, the present invention is not limited to 3 bits. It is also effective for the case where the number of bits except 3 bits is supported and for an image display device having a standard except for XGA.

In this embodiment, operations and structures of a shift register 701, a first memory circuit group 702, a second memory circuit group 703, and a signal line selection circuit group 706 are identical with those in the embodiment mode.

This embodiment is different from the embodiment mode in a point that a bit comparison pulse width converter circuit group 704 and an analog switch group 705 are provided in a post stage of the second memory circuit group 703. Two circuits, the bit comparison pulse width converter circuit group 704 and the analog switch group 705 function as the ramp type D/A converter circuit.

In this embodiment, 256 bit comparison pulse width converter circuits (BPC) are provided in the bit comparison pulse width converter circuit group. Digital video signals of 3 bits which have been stored in the second memory circuit group 703, count signals (C0 to C2), and a set signal (ST) are input to the BPCs.

In this embodiment, 256 analog switches (ASW) are provided in the analog switch group 705. Outputs (PW-i: "i" is 001 to 256) of the bit comparison pulse width converter circuit group 704 and a gradation power source voltage (VR) are input to the analog switch group 705. Outputs of the analog switch group 705 and selection signals (SS1 to SS4) are input to the signal line selection circuit group 706.

Figure 8:
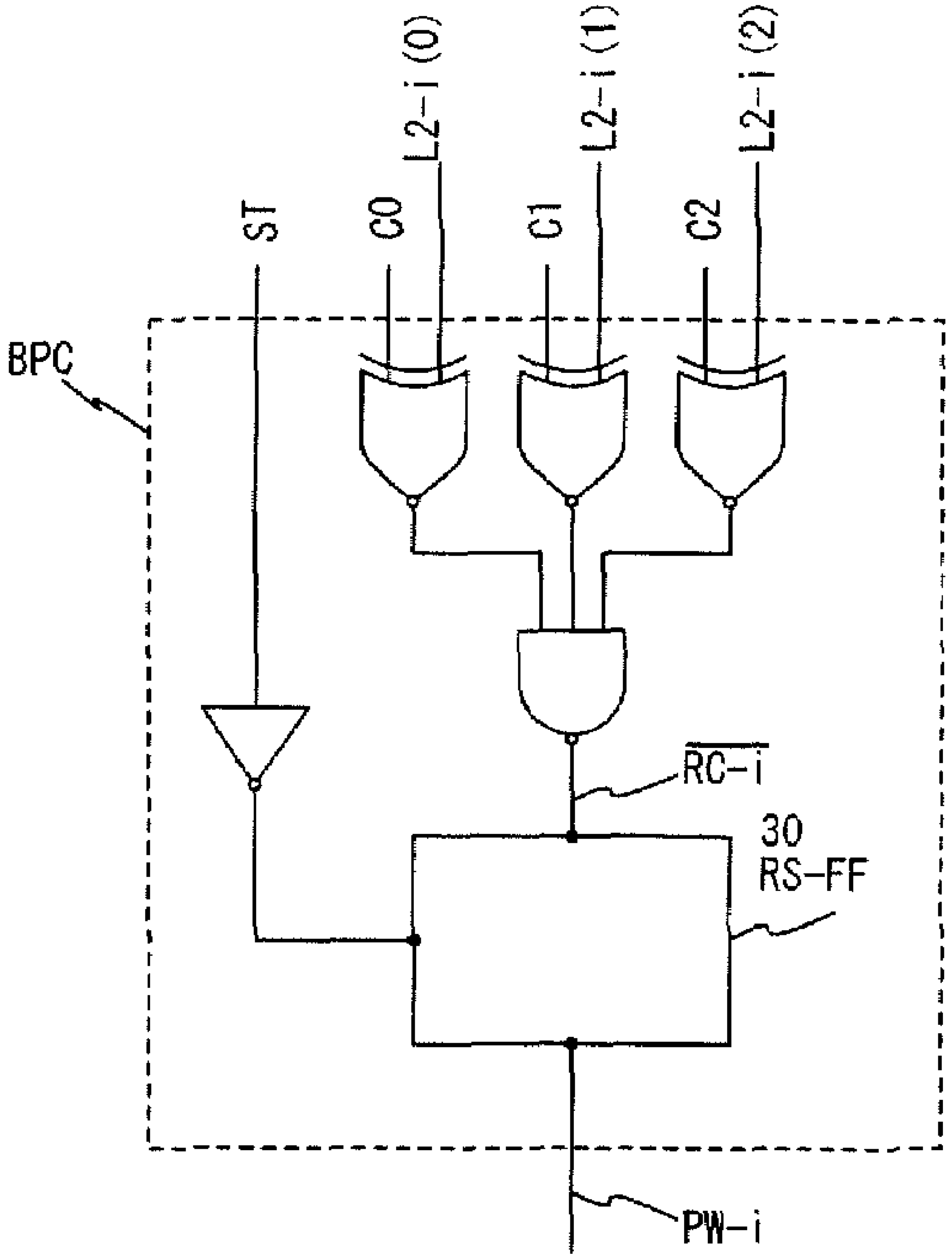
FIG. 8 shows a structure of a bit comparison pulse width converter circuit (BPC)

FIG. 8 shows an example of a structure of a BPC of an i-th stage. The BPC includes exclusive logical OR gates, a 3-input NAND gate, an inverter, and a set-reset flip-flop (RS-FF). In FIG. 8, outputs of the second memory circuit of an i-th stage are indicated to be L2-*i*(0), L2-*i*(1), and L2-*i*(2) (bit number is indicated inside the brackets) by bit separation.

Figure 9:
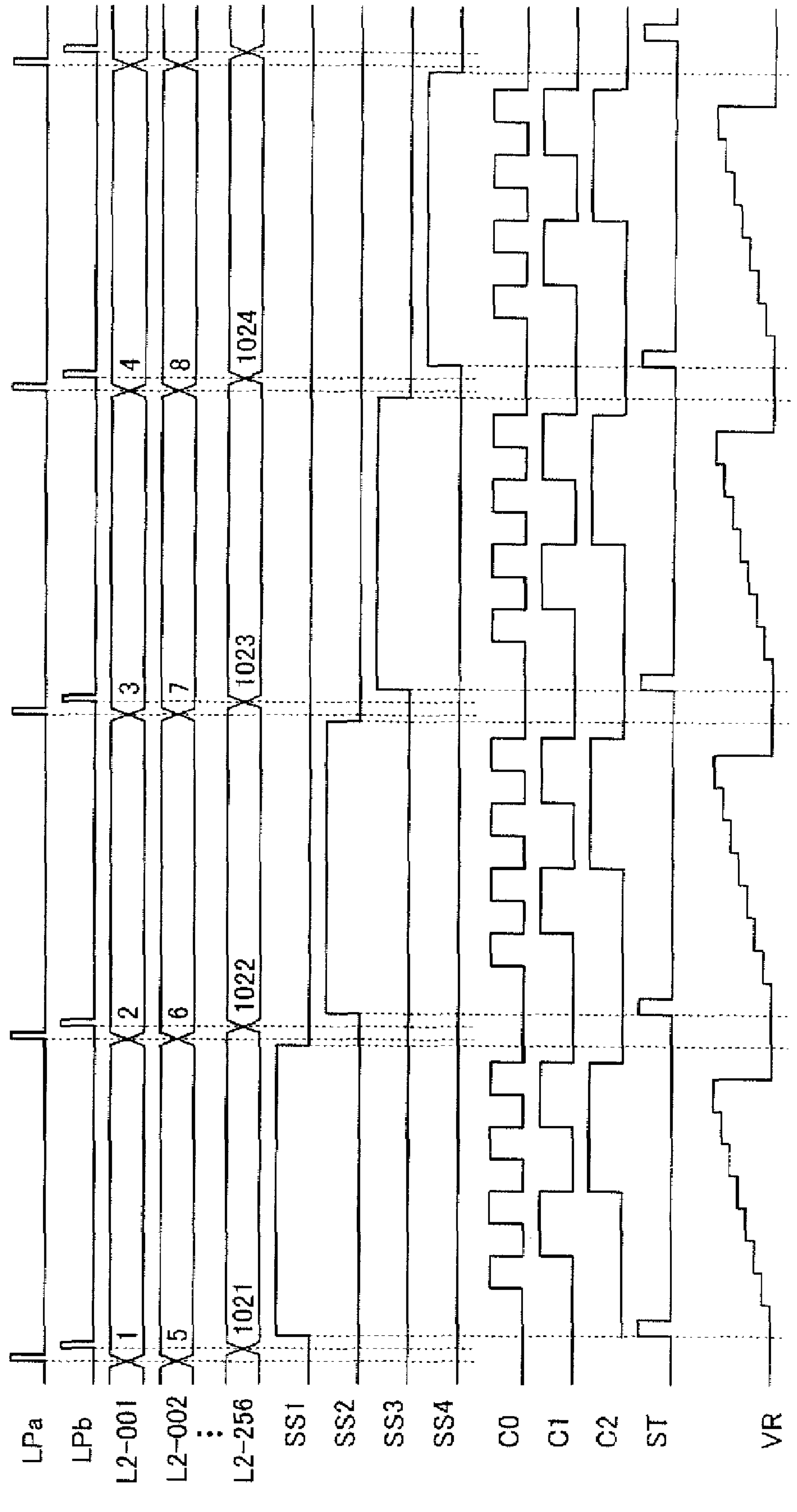
FIG. 9 is a timing chart of the driver circuit shown in FIG. 7.

Next, an operation of the signal line driver circuit of this embodiment will be described. FIG. 9 is a timing chart of signals necessary to understand the schematic operation of circuits in FIG. 7. The operation from the shift register 701 to the second memory circuit group 703 is also identical with that of the signal line driver circuit indicated in the embodiment mode. Also, the selection signals (SS1 to SS4) input to the signal line selection circuit group 706 are identical with those in the case of the signal line driver circuit shown in FIG. 2 in the embodiment mode.

In FIG. 9, the count signals (C0 to C2), the set signal (ST), and the gradation power source voltage (VR) are periodically input every time 4 signal lines are selected in succession by the signal line selection circuit group 706. Thus, writing of information into all the signal lines can be simultaneously conducted.

Figure 10:
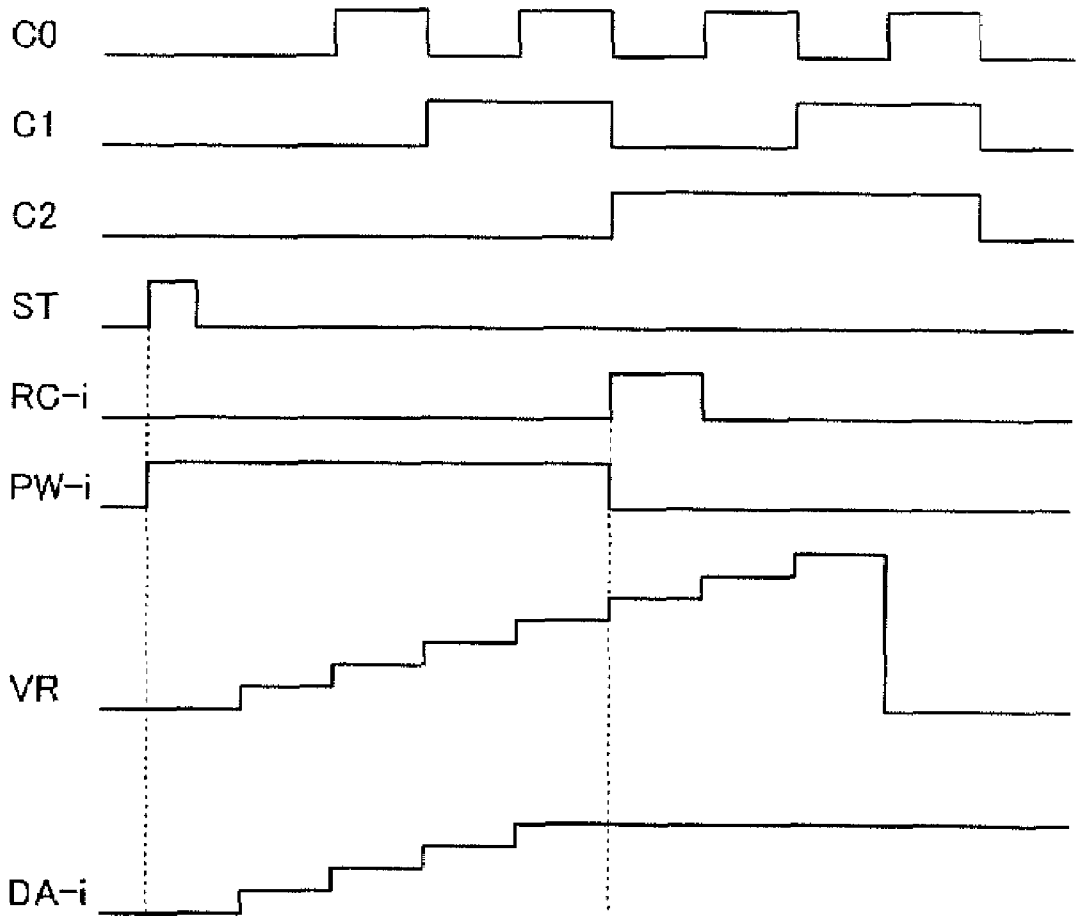
FIG. 10 is an explanatory view of an operation of a ramp type D/A converter circuit.

Here, a detail operation of the ramp type D/A converter circuit will be described. FIG. 10 is a timing chart during a period during which one signal line among 4 signal lines is selected by the signal line selection circuit.

First, an RS-FF 30 is set in synchronization with a pulse of the set signal. Thus, an output PW-i becomes a Hi level. Next, the digital video signals stored in the second memory circuit group 703 are compared with the count signals (C0 to C2) every bit by the exclusive logical OR gates. When all of 3 bits are identical, outputs of all the exclusive logical OR gates become a Hi level. As a result, an output of the 3-input NAND gate (reverse RC-i) becomes a Lo level (thus, an RC-i becomes a Hi level). The output of the 3-input NAND gate is also input to the RS-FF 30. When the RC-i becomes a Hi level, the RS-FF 30 is reset and the output PW-i is returned to a Lo level. Output examples of RC-i, PW-i, and DA-i in the case where 3 bits {L2-*i*(0), L2-*i*(1), L2-*i*(2)} in the digital video signal are {0, 0, 1} are indicated in FIG. 10. Thus, the information of the digital video signal is converted into a pulse width of the output PW-i of the BPC.

The output PW-i of the BPC is used to control an on/off of the analog switch group 705. In this embodiment, only when the output PW-i of the BPC is at a Hi level, the analog switch group 705 is in an on state. When the PW-i becomes at a Lo level, the analog switch group 705 is in an off state. The gradation power source voltage (VR) having step voltage levels synchronous with the count signals (C0 to is C2) is applied to the analog switch group 705. A gradation power source voltage (VR) at the instant when the PW-i becomes at a Lo level is written into the signal line through the signal line selection circuit of post-stage.

With the above operation, the digital video signal is converted into the analog video signal to drive the signal lines. Note that the gradation power source voltage (VR) is not necessarily in a step shape and may be continuously and monotonically changed. Also, a buffer circuit, a level shifter circuit, and the like may be inserted between the output of the bit comparison pulse width converter circuit group 704 and the analog switch group 705.

As described above, according to the present invention, the ramp type D/A converter circuit can be also used as the D/A converter circuit, the circuit structure can be reduced to about one fourth in a conventional case, and the occupying area of the driver circuit and the number of elements therein can be greatly reduced.

The structure of this embodiment can be embodied by being freely combined with Embodiments 1 to 3.

Embodiment 5

A method of manufacturing an active matrix liquid crystal display device is employed in Embodiment 5 as an example of a specific method of manufacturing an active matrix image display device. In particular, a method of manufacturing a pixel TFT, which is a switching element of a pixel portion, and a TFT of a driver circuit (such as a signal line driver circuit and a scanning line driver circuit) formed in the periphery of the pixel portion, on the same substrate is explained in detail in accordance with process steps. Note that in order to simplify the explanation, a CMOS circuit, which is a fundamental structure circuit of the driver circuit portion, is shown in the figures as the driver circuit portion. In addition, an n-channel TFT is shown in the figures as the pixel TFT portion.

Figures 11A, 11B, 11C, 11D:
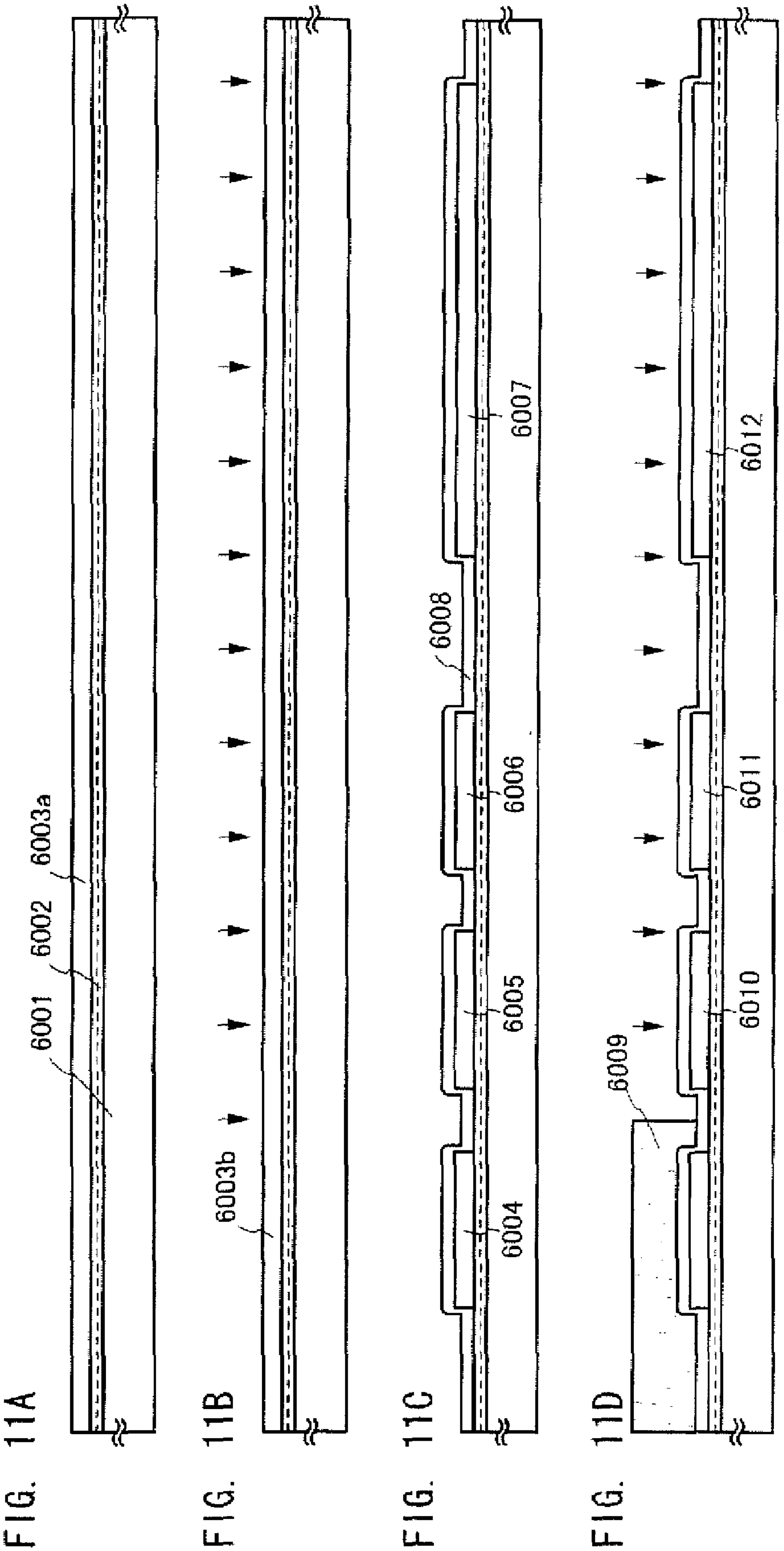
FIGS. 11A to 11D show examples of manufacturing steps of an active matrix liquid crystal display device in accordance with Embodiment 3.

In FIG. 11A, a low alkali glass substrate or a quartz substrate can be used as a substrate (active matrix substrate) 6001. In this embodiment, the low alkali glass substrate is used as the substrate 6001. In this case, the glass substrate may be thermally treated in advance at a temperature lower than the glass distortion point by 10 to 20° C. On the surface of the substrate 6001 where the TFTs are to be formed, for the purpose of preventing impurity diffusion from the substrate 6001, a base film 6002 of silicon oxide film, silicon nitride film, silicon oxynitride film, or the like is formed. For example, a silicon oxynitride film formed from $SiH_4$, $NH_3$, and $N_2O$ may be formed by plasma CVD at a thickness of 100 nm, and a silicon oxynitride film formed from $SiH_4$ and $N_2O$ may be formed similarly at a thickness of 200 nm to form lamination.

Next, a semiconductor film 6003*a* having the amorphous structure is formed by a known method such as plasma CVD or sputtering at a thickness of from 20 to 150 nm (preferably 30 to 80 nm). In this embodiment, an amorphous silicon film is formed by plasma CVD at a thickness of 54 nm. Such semiconductor films having the amorphous structure include amorphous semiconductor films, microcrystalline semiconductor films, and the like, and a compound semiconductor film having the amorphous structure such as an amorphous silicon germanium film may also be used. Further, since the base film 6002 and an amorphous silicon film 6003*a* can be formed using the same deposition method, the two may be continuously formed. By not exposing the substrate to the atmosphere after the base film is formed thereon, contamination of the surface can be prevented, and thus variation in the characteristics of the TFTs to be formed thereon and variation in the threshold voltage can be decreased (FIG. 11A).

Then, using known crystallization technique, a crystalline silicon film 6003*b* is formed from the amorphous silicon film 6003*a*. For example, laser crystallization or thermal crystallization (solid phase growth method) may be used. Here, according to the technique disclosed in Japanese Patent Application Laid-Open No. Hei 7-130652, with crystallization using a catalytic element, the crystalline silicon film 6003*b* is formed. Prior to the crystallization process, it is preferable to, depending on the amount of hydrogen contained in the amorphous silicon film, carry out heat treatment at 400 to 500° C. for about an hour to make the amount of hydrogen contained to be 5 atomic % or less. Since the atoms are rearranged to be denser when the amorphous silicon film is crystallized, the thickness of the crystalline silicon film to be formed is smaller than that of the original amorphous silicon film (54 nm in this embodiment) by 1 to 15% (FIG. 11B).

Then, the crystalline silicon film 6003*b* is patterned to be island shape to form island shape semiconductor layers 6004 to 6007. After that, a mask layer 6008 is formed of silicon oxide film by plasma CVD or sputtering at a thickness of from 50 to 150 nm (FIG. 11C).

Next, a resist mask 6009 is provided, and for the purpose of controlling the threshold voltage, boron (B) is doped all over the surface of island shape semiconductor layers 6005 to 6007 for forming n-channel TFTs as an impurity element imparting p-type at the concentration of from about $1\times10^{16}$ to $5\times10^{17}$ atoms/cm$^3$. Boron (B) may be doped by ion doping, or alternatively, may be doped simultaneously with the formation of the amorphous silicon film. The boron (B) doping here is not always needed (FIG. 11D). Thereafter, the resist mask 6009 is removed.

Figures 12A, 12B, 12C, 12D:
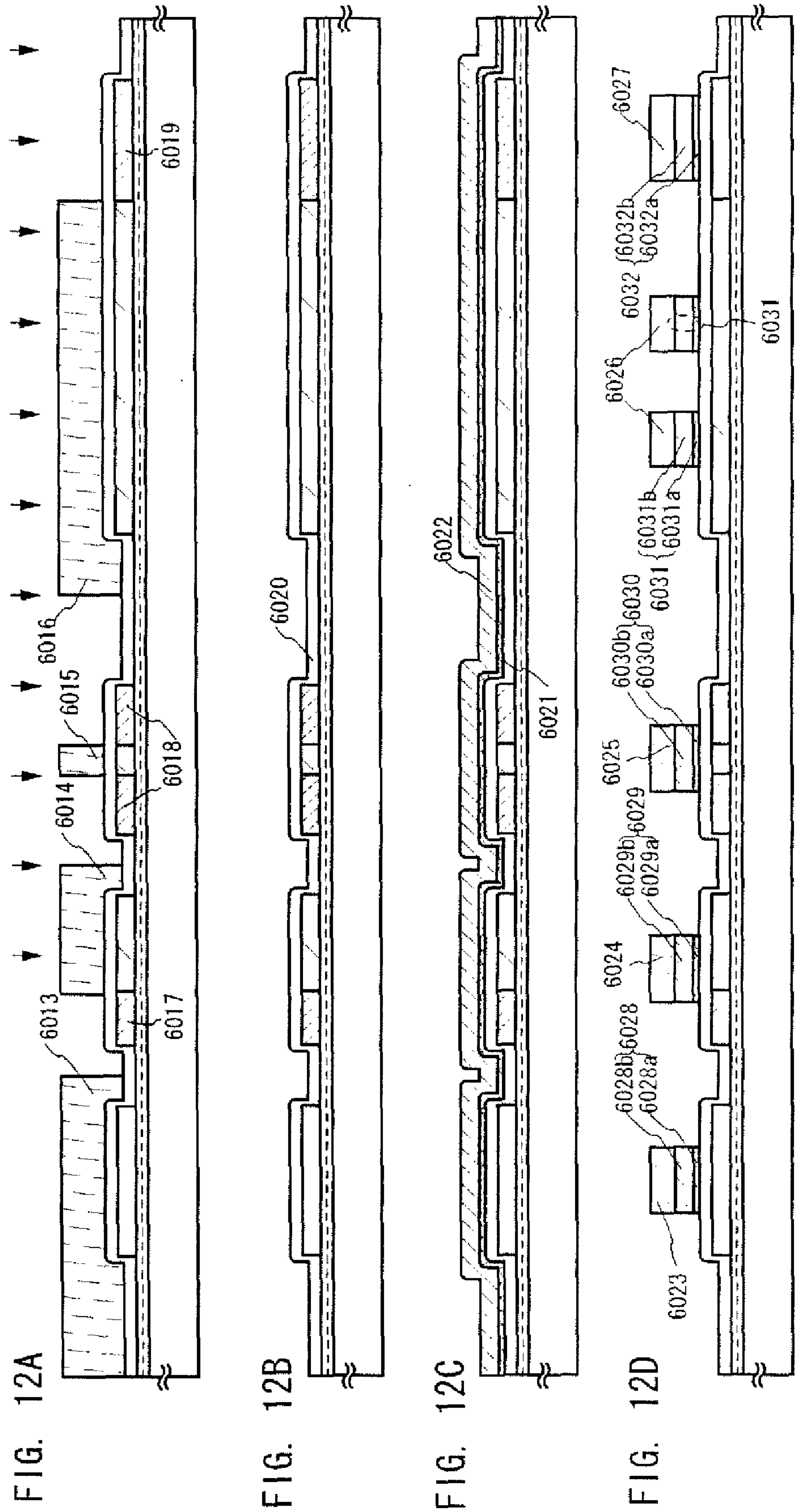
FIGS. 12A to 12D show examples of manufacturing steps of the active matrix liquid crystal display device in accordance with Embodiment 3.

For the purpose of forming the LDD regions of the n-channel TFTs of the driving circuit, an impurity element imparting n-type is selectively doped in the island shape semiconductor layers 6010 to 6012, which requires the formation of resist masks 6013 to 6016 in advance. As the impurity element imparting n-type, phosphorus (P) or arsenic (As) may be used. Here, ion doping with phosphine ($PH_3$) is used to dope phosphorus (P). The concentration of phosphorus (P) in formed impurity regions 6017 and 6018 is in the range of from $2\times10^{16}$ to $5\times10^{19}$ atoms/cm$^3$. The concentration of the impurity element imparting n-type contained in impurity regions 6017 to 6019 formed here is herein referred to as $^-$ throughout this application. An impurity region 6019 is a semiconductor layer for forming the storage capacitance of the pixel portion. Phosphorus (P) at the same concentration is also doped in this region (FIG. 12A). After that, the resist masks 6013 to 6016 are removed.

Next, the mask layer 6008 is removed with fluoric acid or the like and an activation step for the impurity elements doped in FIGS. 11D and 12A is carried out. The activation can be carried out by heat treatment in a nitrogen atmosphere at 500 to 600° C. for 1 to 4 hours or laser activation, or the two may be used jointly. In this embodiment, laser activation is adopted and KrF excimer laser light (wavelength: 248 nm) is used to form linear beams having the oscillating frequency of from 5 to 50 Hz and the energy density of from 100 to 500 mJ/cm$^2$ which scans with the overlapping ratio of from 80 to 98% to treat the whole surface of the substrate having the island shape semiconductor layers formed thereon. It is to be noted that there is no limitation on the conditions of the laser light irradiation, and the conditions may be appropriately decided by the operator.

Then, a gate insulating film 6020 is formed from an insulating film containing silicon by plasma CVD or sputtering at a thickness of from 10 to 150 nm. For example, a silicon oxynitride film at a thickness of 120 nm is formed. A single layer or lamination of other insulating films containing silicon may also be used as the gate insulating film (FIG. 12B).

Next, to form gate electrodes, a first conductive layer is formed. Though the first conductive layer may be a single-layer conductive layer, it may be the laminated structure of, for example, two or three layers, depending on the situation. In this embodiment, a laminated layer consisting of a conductive layer (A) 6021 made from a conductive nitride metallic film and a conductive layer (B) 6022 made from a metallic film is formed. The conductive layer (B) 6022 may be formed of an element selected from tantalum (Ta), titanium (Ti), molybdenum (Mo), and tungsten (W), an alloy containing the foregoing elements as its main constituent, or an alloy film of a combination of the elements (typically Mo—W alloy film or Mo—Ta alloy film). The conductive layer (A) 6021 may be formed of tantalum nitride (TaN), tungsten nitride (WN), titanium nitride (TiN) or molybdenum nitride (MoN). Further, the conductive layer (A) 6021 also may be formed of tungsten silicide, titanium silicide or molybdenum silicide as a substitute material. As to the conductive layer (B) 6022, it is preferable that the concentration of the impurity contained for lowering resistance is reduced. In particular, the concentration of oxygen is desirable to be 30 ppm or less. For example, if the concentration of oxygen is 30 ppm or less, resistance value of 20 μΩcm or less can be realized with respect to tungsten (W).

The thickness of the conductive layer (A) 6021 is 10 to 50 nm (preferably 20 to 30 nm), while that of the conductive layer (B) 6022 is 200 to 400 nm (preferably 250 to 350 nm). In this embodiment, a tantalum nitride film at a thickness of 30 nm is used as the conductive layer (A) 6021, while a Ta film at a thickness of 350 nm is used as the conductive layer (B) 6022, both of which are formed by sputtering. When sputtering is used to form the films, by adding an appropriate amount of Xe or Kr to Ar as the sputtering gas, the internal stress of the film to be formed can be alleviated to prevent the film from peeling off. Note that, although not shown, it is effective to form a silicon film at a thickness of from 2 to 20 nm, doped with phosphorus (P), under the conductive layer (A) 6021. This improves the adherence of the conductive layer to be formed thereon, and oxidation can be prevented. At the same time, a small amount of the alkaline element contained in the conductive layer (A) or the conductive layer (B) can be prevented from dispersing into the gate insulating film 6020 (FIG. 12C).

Then, resist masks 6023 to 6027 are formed and the conductive layers (A) 6021 and (B) 6022 are etched together to form gate electrodes 6028 to 6031, and capacitor wirings 6032. The gate electrodes 6028 to 6031 and the capacitor wiring 6032 are constructed of the conductive layers (A) 6028*a* to 6032*a* and the conductive layers (B) 6028*b* to 6032*b*, which are integrally formed. Here, the gate electrodes 6028 to 6030 of TFTs, which constitute the driver circuits, are formed so as to overlap parts of the impurity regions 6017 and 6018 through the gate insulating film 6020 (FIG. 12D).

Figures 13A, 13B, 13C, 13D:
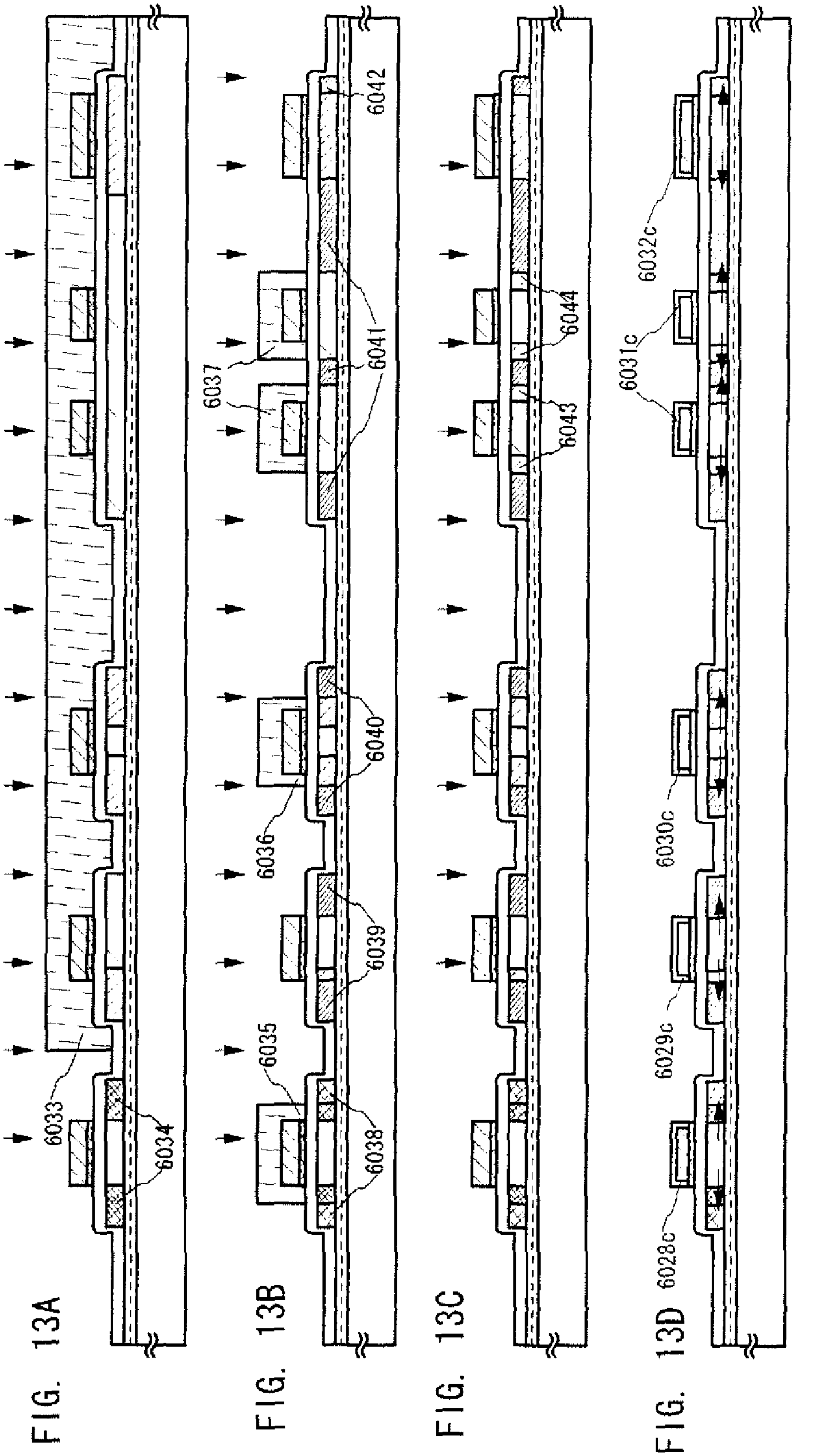
FIGS. 13A to 13D show examples of manufacturing steps of the active matrix liquid crystal display device in accordance with Embodiment 3.

Then, for the purpose of forming the source and drain regions of the p-channel TFT of the driving circuit, a step of doping an impurity element imparting p-type is carried out. Here, with the gate electrode 6028 being as the mask, the impurity region is formed in a self-aligning manner. Here, the regions where the n-channel TFTs are to be formed are covered with a resist mask 6033. Impurity regions 6034 are formed by ion doping using diborane ($B_2H_6$). The concentration of boron (B) in these regions is $3\times10^{20}$ to $3\times10^{21}$ atoms/cm$^3$. Thereafter the resist mask 6033 is removed. The concentration of the impurity element imparting p-type contained in the impurity regions 6034 formed here is herein referred to as $p^{++}$ (FIG. 13A).

Next, in the n-channel TFTs, impurity regions to function as source or drain regions are formed. Resist masks 6035 to 6037 are formed and an impurity element imparting n-type is doped to form impurity regions 6039 to 6042. This is done by ion doping using phosphine ($PH_3$) with the concentration of phosphorus (P) in these regions being $1\times10^{20}$ to $1\times10^{21}$ atoms/cm$^3$. The concentration of the impurity element imparting n-type contained in the impurity regions 6039 to 6042 formed here is herein referred to as $n^+$ (FIG. 13B).

The impurity regions 6039 to 6042 already contain phosphorus (P) or boron (B) doped in previous steps, but since phosphorus (P) is doped at a sufficiently larger concentration, the influence of phosphorus (P) or boron (B) doped in the previous steps can be neglected. Further, since the concentration of phosphorus (P) doped in the impurity regions 6038 is ½ to ⅓ of that of boron (B) doped in FIG. 13A, the conductivity of p-type is secured without any influence on the TFT characteristics.

After removing the resist masks 6035 to 6037, for the purpose of forming the LDD regions of the n-channel TFT of the pixel portion, a step of doping impurity element imparting n-type is carried out. Here, an impurity element imparting n-type in a self-aligning manner is doped by ion doping with the gate electrode 6031 as a mask. The concentration of the doped phosphorus (P) is $1\times10^{16}$ to $5\times10^{18}$ to atoms/cm$^3$. By carrying out the doping with the concentration lower than that of the impurity elements doped in FIGS. 12A, 13A, and 13B, only impurity regions 6043 and 6044 are actually formed. The concentration of the impurity element imparting n-type contained in the impurity regions 6043 and 6044 formed here is herein referred to as $n^+$ (FIG. 13C).

After that, a heat treatment step is carried out to activate the impurity elements imparting n-type or p-type doped at the respective concentrations. The step can be carried out by furnace annealing, laser annealing, or rapid thermal annealing (RTA). Here, the activation step is carried out by furnace annealing. Heating is carried out at the concentration of oxygen of 1 ppm or less, preferably 0.1 ppm or less in a nitrogen atmosphere at 400 to 800° C., typically 500 to 600° C., in this embodiment 500° C. for four hours. Further, in case of using a quartz substrate having heat resistance as the substrate 6001, a heat treatment may be carried out at 800° C. for 1 hour. Then, the activation of the impurity element can be realized, and an impurity region doped with the impurity element and a channel forming region are satisfactory jointed together. Note that this effect may not be obtained in the case of forming an interlayer film for preventing the Ta film of the gate electrode from peeling off.

In the above heat treatment, conductive layers (C) 6028*c* to 6032*c* are formed at a thickness of 5 to 80 nm on the surface of metallic films 6028*b* to 6032*c* comprising the gate electrodes 6028 to 6031 and the capacitor wiring 6032. For example, tungsten nitride (WN) and tantalum nitride (TaN) can be formed when the conductive layers (B) 6028*b* to 6032*b* are tungsten (W) and tantalum (Ta), respectively. Besides, the conductive layers (C) 6028c to 6032*c* can be formed similarly by exposing the gate electrodes 6028 to 6031 and the capacitor wiring 6032 in a plasma atmosphere containing nitrogen using nitrogen or ammonia or the like. Then, a heat treatment is carried out in an atmosphere containing 3 to 100% of hydrogen at 300 to 450° C. for 1 to 12 hours to hydrogenate the island shape semiconductor layers. This process is a process where the dangling bonds in the semiconductor layers are terminated by thermally excited hydrogen. As other means for hydrogenation, plasma hydrogenation (hydrogen excited by plasma is used) may be carried out.

In the case where the island shape semiconductor layers are formed from an amorphous silicon film by crystallization using a catalytic element, a small amount of the catalytic element remains in the island shape semiconductor layers. Of course, it is still possible to complete a TFT in such a condition, but it is more preferable to remove the remaining catalytic element at least from the channel forming region. To utilize the gettering action by phosphorus (P) is one of the means for removing the catalytic element. The concentration of phosphorus (P) necessary for the gettering is about the same as that in the impurity region ($n^+$) formed in FIG. 13B. By the heat treatment in the activation process carried out here, the catalytic element can be gettered from the channel forming regions of the n-channel TFTs and the p-channel TFTs (FIG. 13D).

Figure 14A:
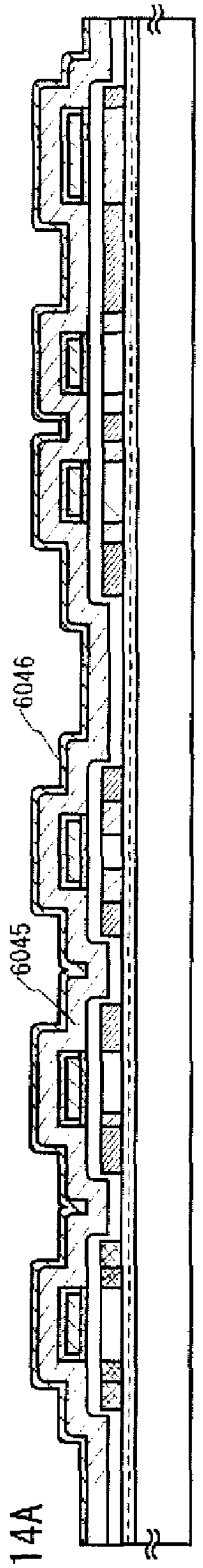
FIGS. 14A to 14C show examples of manufacturing steps of the active matrix liquid crystal display device in accordance with Embodiment 3.
Figure 14B:
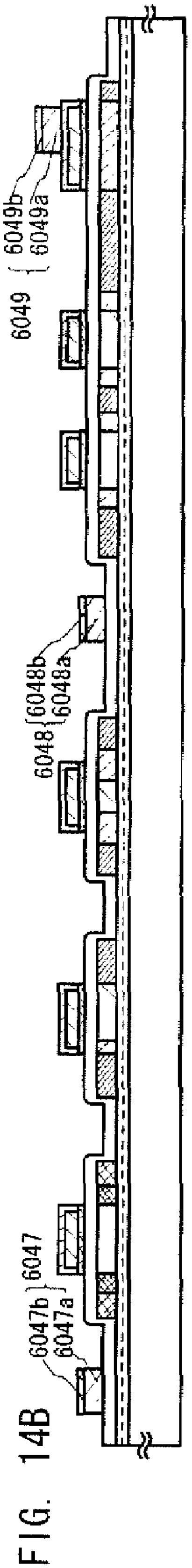

After completing the activation and hydrogenation processes, a second conductive film that is made into a gate wiring (scanning line) is formed. The second conductive film may be formed by a conductive layer (D) having a low resistance material such as aluminum (Al) or copper (Cu) as its main constituents, and a conductive layer (E) comprising titanium (Ti), tantalum (Ta), tungsten (W), or molybdenum (Mo). In Embodiment 5, an aluminum (Al) film containing 0.1 to 2 weight % titanium (Ti) is formed as a conductive layer (D) 6045, and a titanium (Ti) film is formed as a conductive layer (E) 6046. The conductive layer (D) 6045 may be formed having a thickness from 200 to 400 nm (preferably between 250 and 350 nm), and the conductive layer (E) 6046 may be formed with a thickness of 50 to 200 nm (preferably between 100 and 150 nm) (See FIG. 14A).

Then, in order to form a gate wiring (scanning line) connecting a gate electrode, the conductive layer (E) 6046 and the conductive layer (D) 6045 are etched, forming gate wirings (scanning line) 6047 and 6048, and a capacitor wiring 6049. Regarding the etching process, by first removing material from the surface of the conductive layer (E) to a point within the conductive layer (D) by dry etching using a mixed gas of $SiCl_4$, $Cl_2$, and $BCl_3$, and then removing the remainder of the conductive layer (D) by wet etching using a phosphoric acid etching solution, a gate wiring (scanning line) can be formed while retaining selective processability with the base.

A first interlayer insulating film 6050 is formed by a silicon oxide film or a silicon oxynitride film with a thickness of 500 to 1500 nm. Contact holes for reaching source regions or drain regions formed in the respective island shape semiconductor layers are formed next, and source wirings (signal lines) 6031 to 6054, and drain wirings 6055 to 6058 are formed. Although not shown in the figures, a three-layer structure lamination film in which a 100 nm thick Ti film, a 300 nm thick aluminum film containing Ti, and a 150 nm thick Ti film are formed in succession by sputtering in Embodiment 5 for these electrodes.

Figure 14C:
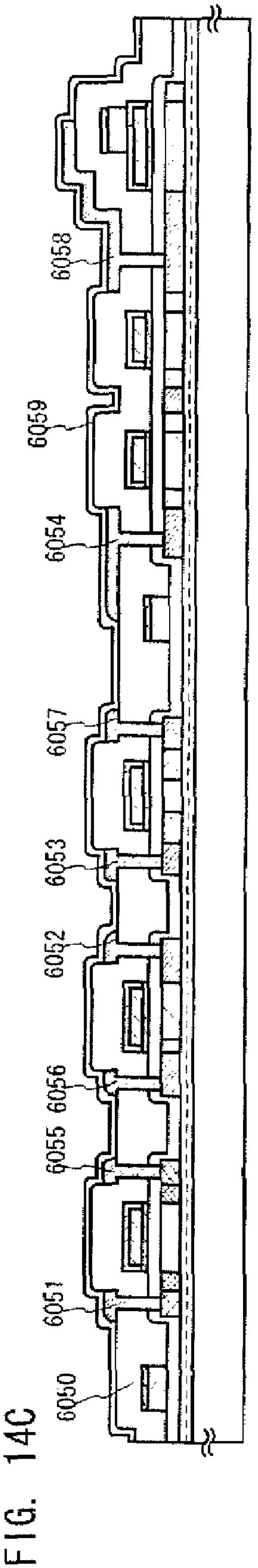

Next, a silicon nitride film, a silicon oxide film, or a silicon oxynitride film is formed having a thickness from 50 to 500 nm (typically between 100 and 300 nm) as a passivation film 6059. If a hydrogenation process is performed in this state, a desirable result can be obtained with respect to improving the TFT characteristics. For example, heat treatment may be performed for 1 to 12 hours at 300 to 450° C. in an atmosphere containing between 3 and 100% hydrogen. A similar result can also be obtained using a plasma hydrogenation process. Note that open portions may also be formed in the passivation film 6059 in positions at which contact holes for connecting pixel electrodes and the drain wiring will later be formed (See FIG. 14C).

Figure 15:
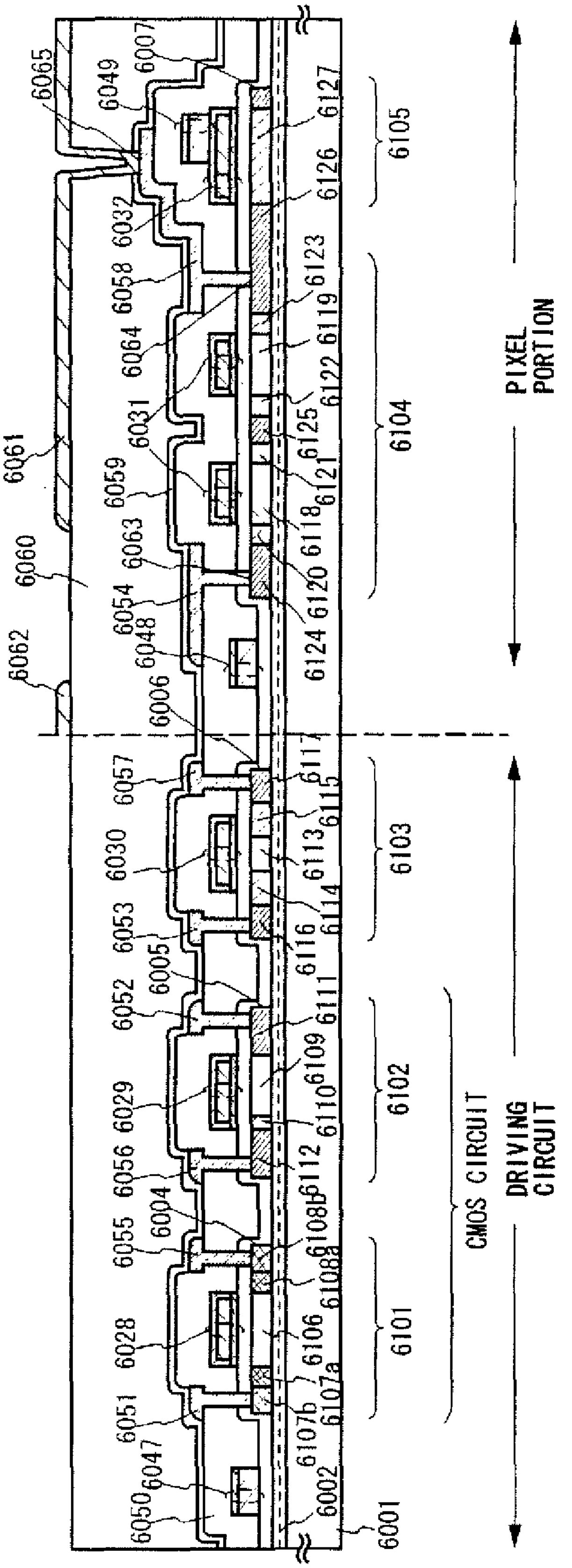
FIG. 15 shows an example of a manufacturing step of the active matrix liquid crystal display device in accordance with Embodiment 3.

A second interlayer insulating film 6060 is formed next from an organic resin film having a thickness of 1:0 to 1.5 μm. Materials such as polyimide, acrylic, polyamide, polyimide amide, and BCB (benzocyclobutene) can be used as the organic resin. The second interlayer insulating film 6060 is formed here by firing at 300° C. after application to the substrate using a thermal polymerization type polyimide. A contact hole for reaching the drain wiring 6058 is then formed in the second interlayer insulating film 6060, and pixel electrodes 6061 and 6062 are formed. A transparent conductive film may be used for the pixel electrodes for a case of a transmitting type liquid crystal display device, and a metallic film may be used for a case of a reflecting type liquid crystal display device. A transmitting type liquid crystal display device is used in Embodiment 5, and therefore an indium tin oxide (ITO) film is formed with a thickness of 100 nm by sputtering (See FIG. 15).

The substrate having the driver circuit TFT and the pixel TFT of the pixel portion on the same substrate can thus be completed. A p-channel TFT 6101, a first n-channel TFT 6102, and a second n-channel TFT 6103 are formed in the driver circuit, and a pixel TFT 6104 and a storage capacitor 6105 are formed in the pixel portion. For convenience, this type of substrate is referred to as an active matrix substrate throughout this specification.

In the p-channel TFT 6101 of the driver circuit, the island shape semiconductor layer 6004 has a channel forming region 6106, source regions 6107*a* and 6107*b*, and drain regions 6108*a* and 6108*b*. In the first n-channel TFT 6102, the island shape semiconductor layer 6005 has a channel forming region 6109, an LDD region 6110 overlapping the gate electrode 6029 (this type of LDD region is hereafter referred to as Lov), a source region 6111, and a drain region 6112. The length of the longitudinal direction of the channel of this Lov region is from 0.5 to 3.0 μm, preferably from 1.0 to 1.5 μm. In the second n-channel TFT 6103, the island shape semiconductor layer 6006 has a channel forming region 6113, LDD regions 6114 and 6115, a source region 6116, and a drain region 6117. An LDD region, which does not overlap the Lov region and the gate electrode 6030, is formed as this LDD region (this type of LDD region is hereafter referred to as Loff). The length of the longitudinal direction of the channel of this Loff region is from 0.3 to 2.0 μm, preferably between 0.5 and 1.5 μm. In the pixel TFT 6104, the island shape semiconductor layer 6007 has channel forming regions 6118 and 6119, Loff regions 6120 to 6123, and source or drain regions 6124 to 6126. The length of the longitudinal direction of the channel of this Loff region is from 0.5 to 3.0 μm, preferably between 1.5 and 2.5 μm. In addition, the storage capacitor 6105 is formed from the capacitor wirings 6032 and 6049, an insulating film comprising the same material as the gate insulating film, and a semiconductor layer 6127, to which an impurity element which imparts n-type conductivity is added, connected to the drain region 6126. The pixel TFT 6104 is shown as a double gate structure in FIG. 15, but a single gate structure may also be used, and a multi-gate structure in which a plurality of gate electrodes are formed may also be used without hindrance.

The structure of the TFTs composing each circuit is optimized in response to the specifications required by the pixel TFT and the driver circuit in Embodiment 5, and it is thus possible to improve the operating performance and the reliability of the image display device.

Next, a process of manufacturing a transmitting type liquid crystal display device based on the active matrix substrate manufactured in accordance with the above processes is explained.

Figure 16:
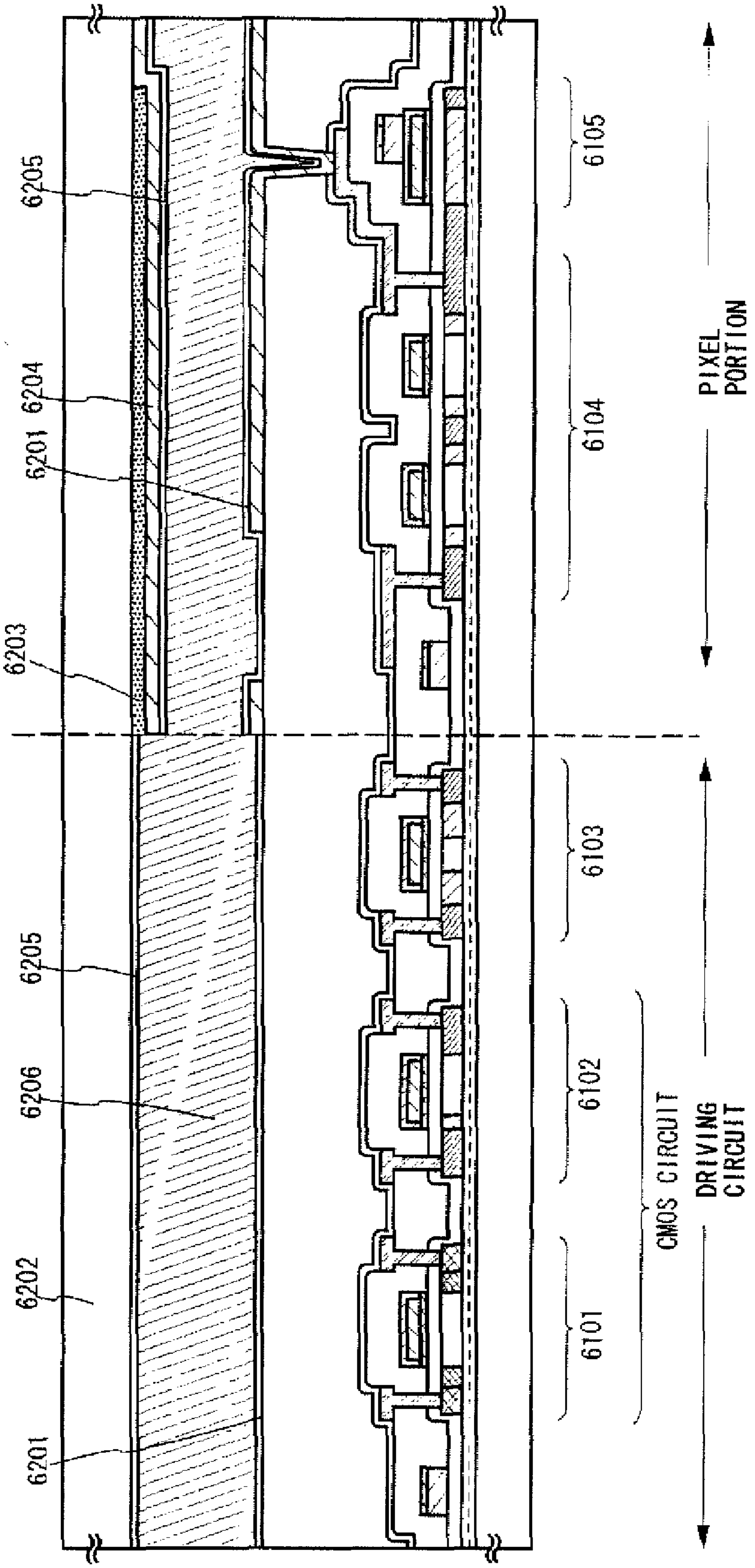
FIG. 16 shows an example of a manufacturing step of the active matrix liquid crystal display device in accordance with Embodiment 3.

Refer to FIG. 16. An orientation film 6201 is formed on the active matrix substrate in the state of FIG. 15. Polyimide is used in the orientation film 6201 in Embodiment 5. An opposing substrate is prepared next. The opposing substrate is structured by a glass substrate 6202, a light shielding film 6203, an opposing electrode 6204 made from a transparent conductive film, and an orientation film 6205.

Note that, in Embodiment 5, a polyimide film is used in the orientation film so that liquid crystal molecules are oriented parallel to the substrate. Note also that, by performing a rubbing process after forming the orientation films, the liquid crystal molecules are given a certain fixed pre-tilt angle and a parallel orientation.

Having gone through the above processes, the active matrix substrate and the opposing substrate are next joined through a means such as a sealing material or spacers (both not shown in the figure) in accordance with a known cell construction process. A liquid crystal 6206 is then injected between both substrates, and this is completely sealed by a sealant (not shown in the figure). A transmitting type liquid crystal display device like the one that shown in FIG. 16 is therefore completed.

Note that a TFT formed in accordance with the above processes has a top gate structure, but the present invention can also be applied to a bottom gate structure TFT and to TFT having other structures.

Further, the image display device manufactured in accordance with the above processes is a transmitting type liquid crystal display device, but the present invention can also be applied to a reflecting type liquid crystal display device.

The configuration of this embodiment can be implemented by freely combined with Embodiments 1 to 4.

Embodiment 6

Such electronic devices using an image display device of the present invention include a video camera, a digital camera, a goggles-type display (head mount display), a navigation system, a sound reproduction device (a car audio equipment and an audio set), a lap-top computer, a game machine, a portable information terminal (a mobile computer, a mobile telephone, a portable game machine, an electronic book, or the like), an image reproduction apparatus including a recording medium (more specifically, an apparatus which can reproduce a recording medium such as a digital video disc (DVD) and so forth, and includes a display for displaying the reproduced image), or the like. FIG. 17 respectively shows various specific examples of such electronic devices.

Figure 17A:
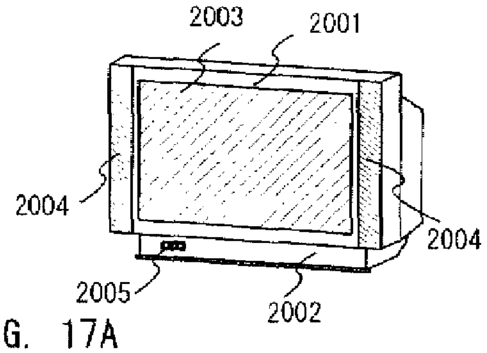
FIGS. 17A to 17H show examples of electronic equipment using the present invention.

FIG. 17A illustrates a liquid crystal display device which includes a casing 2001, a support table 2002, a display portion 2003, a speaker portion 2004, a video input terminal 2005 or the like. The image display device in accordance with the present invention is applicable to the display portion 2003. The liquid crystal display device is including the entire display device for displaying information, such as a personal computer, a receiver of TV broadcasting and an advertising display.

Figure 17B:
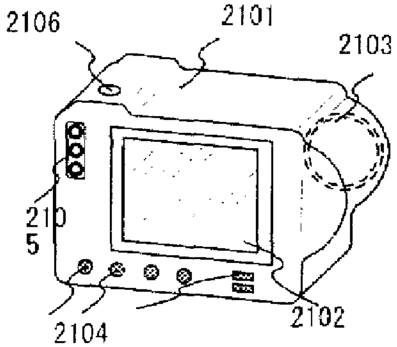

FIG. 17B illustrated a digital still camera which includes a main body 2101, a display portion 2102, an image receiving portion 2103, an operation key 2104, an external connection port 2105, a shutter 2106, or the like. The image display device in accordance with the present invention can be used as the display portion 2102.

Figure 17C:
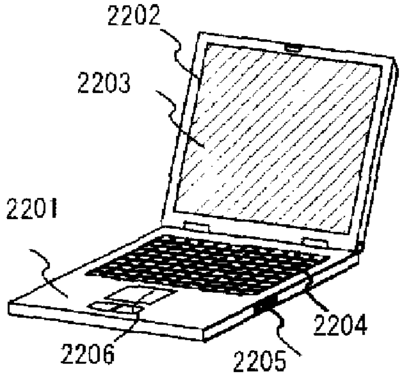

FIG. 17C illustrates a lap-top computer which includes a main body 2201, a casing 2202, a display portion 2203, a keyboard 2204, an external connection port 2205, a pointing mouse 2206, or the like. The image display device in accordance with the present invention can be used as the display portion 2203.

Figure 17D:
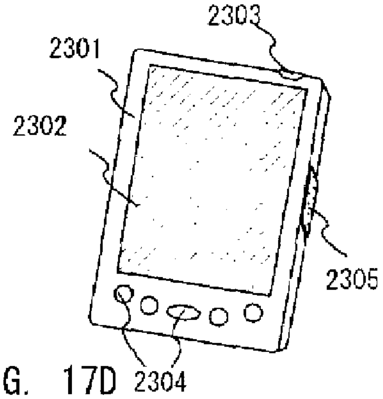

FIG. 17D illustrated a mobile computer which includes a main body 2301, a display portion 2302, a switch 2303, an operation key 2304, an infrared port 2305, or the like. The image display device in accordance with the present invention can be used as the display portion 2302.

Figure 17E:
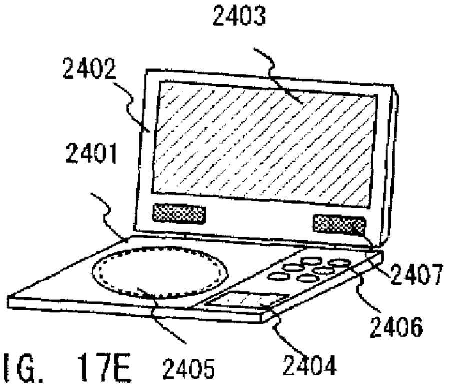

FIG. 17E illustrates a portable image reproduction apparatus including a recording medium (more specifically, a DVD reproduction apparatus), which includes a main body 2401, a casing 2402, a display portion A 2403, another display portion B 2404, a recording medium (DVD or the like) reading portion 2405, an operation key 2406, a speaker portion 2407 or the like. The display portion A 2403 is used mainly for displaying image information, while the display portion B 2404 is used mainly for displaying character information. The image display device in accordance with the present invention can be used as these display portions A 2403 and B 2404. The image reproduction apparatus including a recording medium further includes a game machine or the like.

Figure 17F:
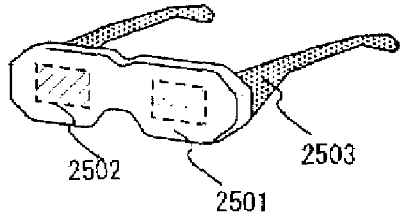

FIG. 17F illustrates a goggle type display (head mounted display) which includes a main body 2501, a display portion 2502, arm portion 2503 or the like. The image display device in accordance with the present invention can be used as the display portion 2502.

Figure 17G:
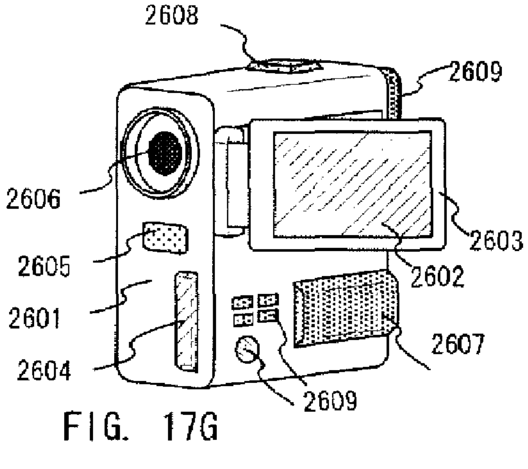

FIG. 17G illustrates a video camera which includes a main body 2601, a display portion 2602, a casing 2603, an external connecting port 2604, a remote control receiving portion 2605, an image receiving portion 2606, a battery 2607, a sound input portion 2608, an operation key 2609, or the like. The image display device in accordance with the present invention can be used as the display portion 2602.

Figure 17H:
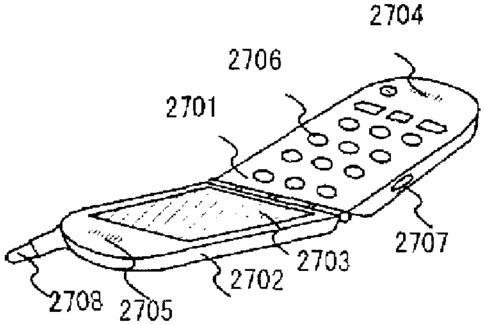

FIG. 17H illustrates a mobile telephone which includes a main body 2701, a casing 2702, a display portion 2703, a sound input portion 2704, a sound output portion 2705, an operation key 2706, an external connecting port 2707, an antenna 2708, or the like. The image display device in accordance with the present invention can be used as the display portion 2703.

Next, the projector (rear type of front type) using the image display device in accordance with the present invention is explained. An example of these is shown in FIGS. 18 and 19.

Figure 18A:
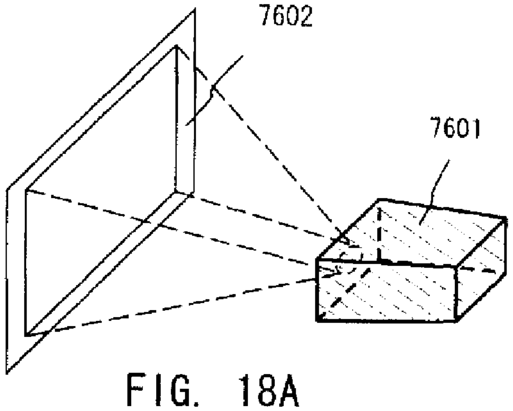
FIGS. 18A to 18D show structures of a projection liquid crystal display device.

FIG. 18A is a front type projector which is structured by a light source optical system and a display device 7601, and a screen 7602. The present invention may be applied to the display portion 7601.

Figure 18B:
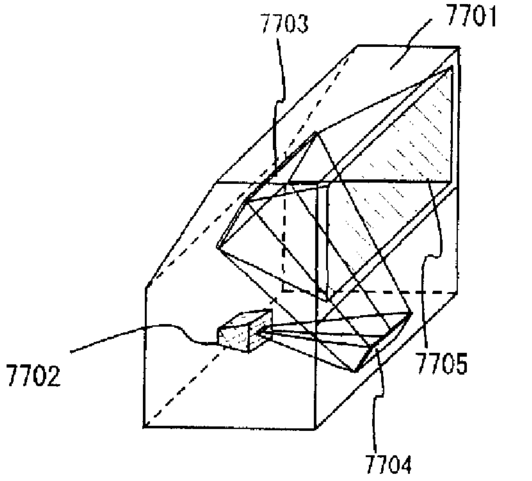

FIG. 18B is a rear type projector which is structured by a main body 7701, a light source optical system and a display device 7702, a mirror 7703, a mirror 7704 and a screen 7705. The present invention may be applied to the display portion 7702.

Figure 18C:
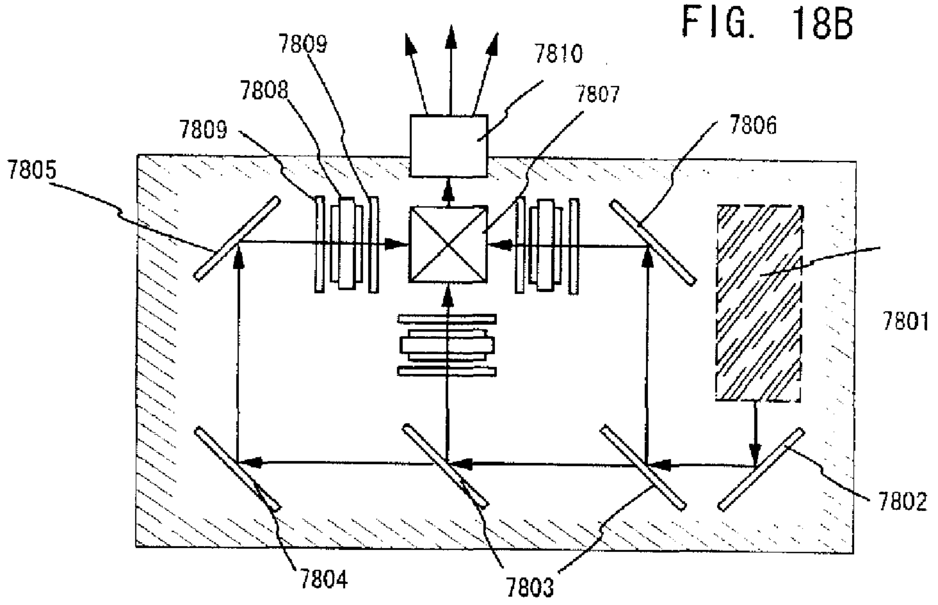

Note that, FIG. 18C is a diagram showing an example of a structure of the light source optical system and the display portion 7601 or 7702 in FIG. 18A or 18B. The light source optical system and the display portion 7601, 7702 are structured by a light source optical system 7801, mirrors 7802, 7804 to 7806, a dichroic mirror 7803, an optical system 7807, a display portion 7808, a phase difference plate 7809 and a projection optical system 7810. The projection optical system 7810 is structured by a plurality of optical lenses provided with a projection lens. This structure is referred to as a three-plate system since it uses three display portions 7808. Further, the operator may provide in the optical path shown by an arrow in FIG. 18C, an optical lens, a film having polarizing functions, a film for adjusting the phase difference, an IR film and the like.

Figure 18D:
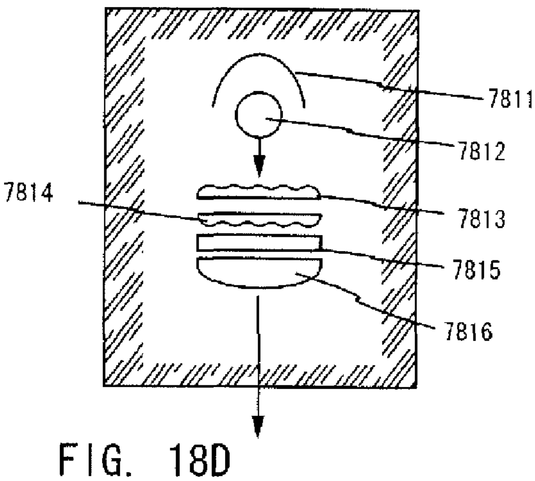

Further, FIG. 18D shows a diagram showing an example of a structure of the light source optical system 7801 in FIG. 18C. In this embodiment, the light source optical system 7801 is structured by a reflector 7811, a light source 7812, lens arrays 7813 and 7814, a polarizing conversion element 7815 and a condenser lens 7816. Note that, the light source optical system shown in FIG. 18D is one example, and it is not limited to this structure. For example, the operator may appropriately provide a light source lens, a film having polarizing functions, a film for adjusting the phase difference, an IR film and the like.

Figure 19A:
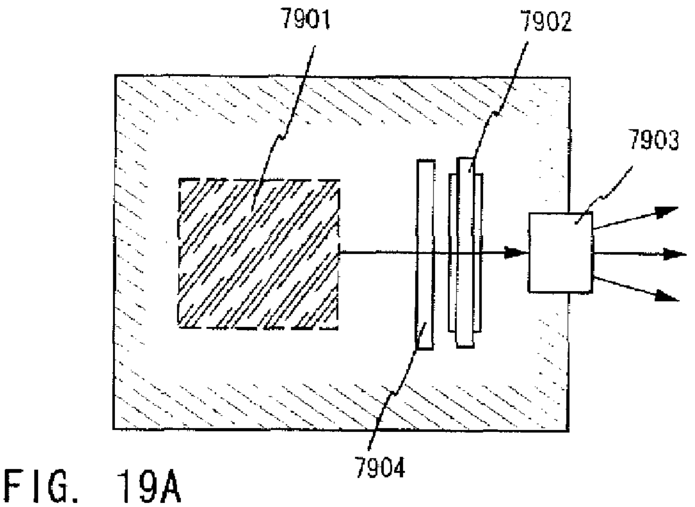
FIGS. 19A to 19C show structures of a projection liquid crystal display device.

FIG. 18C shows an example of a three-plate system, and FIG. 19A is a diagram showing an example of a single-plate system. The light source optical system and the display portion shown in FIG. 19A is structured by a light source optical system 1901, a display device 1902, a projection optical system 7903 and a phase difference plate 7904. The projection optical system 7903 is structured by a plurality of optical lenses with a projection lens. The light source optical system and the display portion shown in FIG. 19A may be applied to the light source optical systems and the display portions 7601, 7702 in FIGS. 18A and 18B. Further, the light source optical system 7901 may use the light source optical system shown in FIG. 18D. Note that, the display portion 1902 is provided with a color filter (not shown), and displays images in color.

Figure 19B:
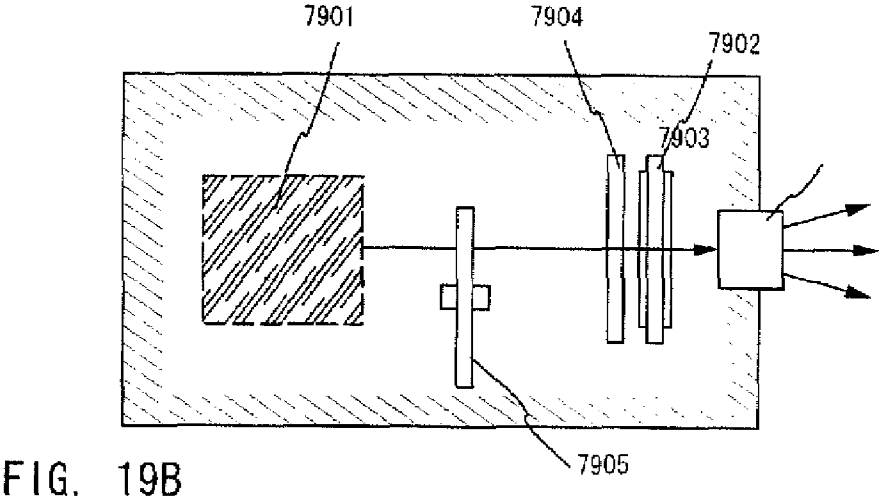

Further, the light source optical system and the display portion shown in FIG. 19B is an applied example of FIG. 19A, and instead of providing a color filter, a RGB rotating color filter disk 7905 is used to display images in color. The light source optical system and the display portion shown in FIG. 19B may be applied to the light source optical systems and the display portions 7601, 7702 shown in FIGS. 18A and 18B.

Figure 19C:
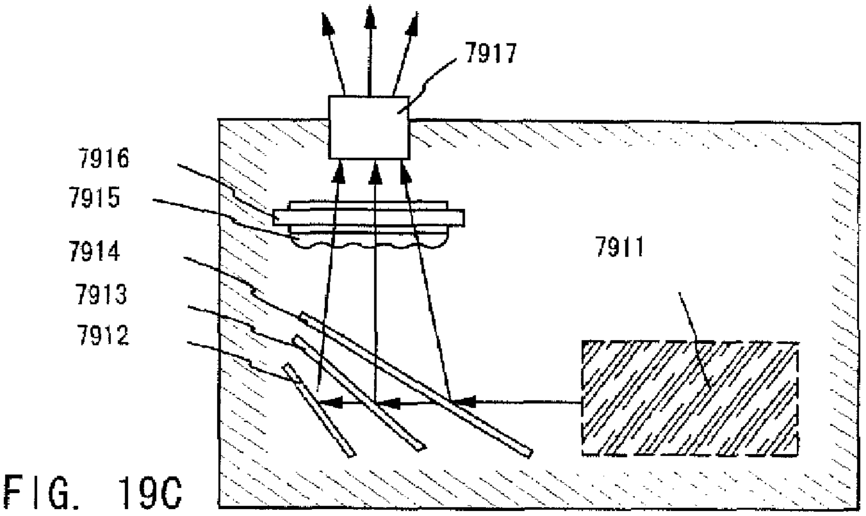
Figure 20:
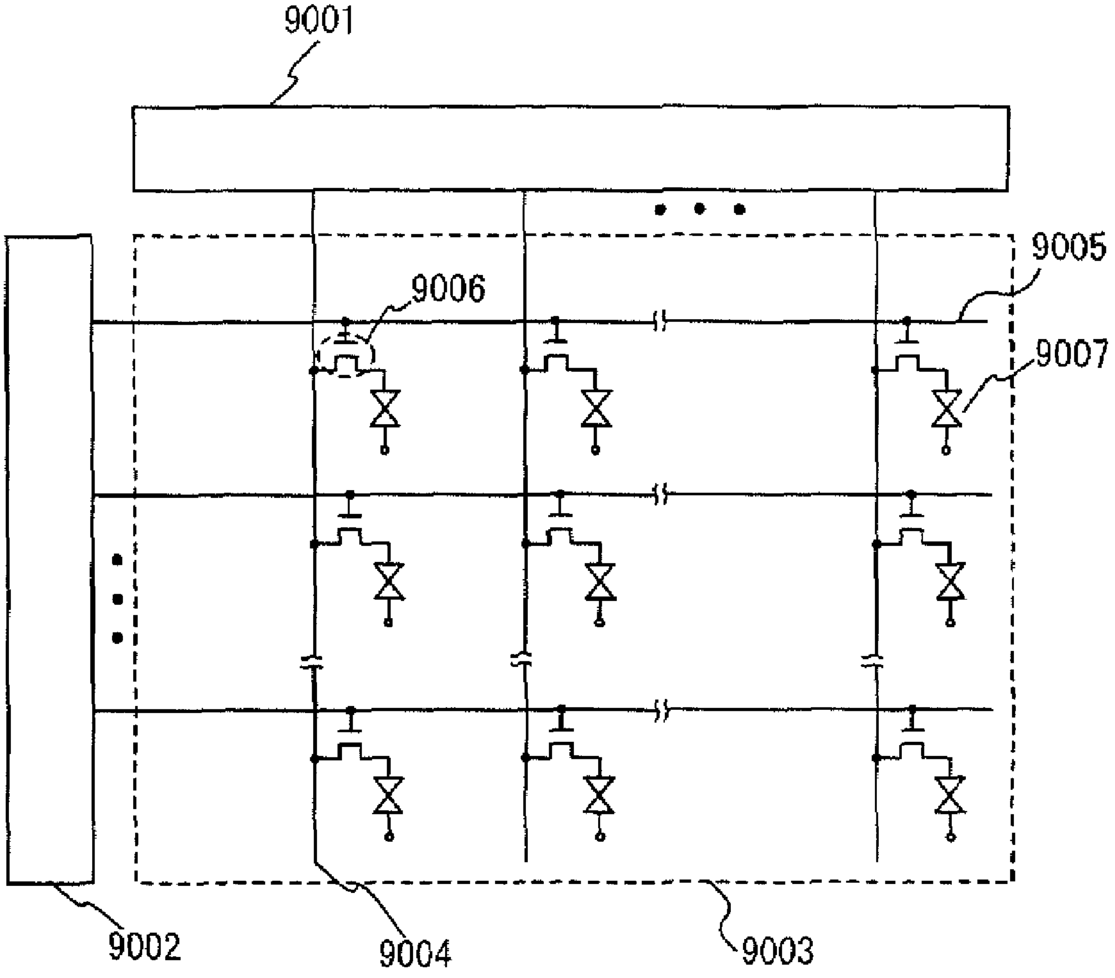
FIG. 20 shows a structure of an active matrix liquid crystal display device.

Further, the light source optical system and the display portion shown in FIG. 19C is referred to as a color-filterless single-plate system. This system provides a micro lens array 7915 in the display portion 7916 and displays a color image by using a dichroic mirror (green) 7912, a dichroic mirror (red) 7913 and a dichroic mirror (blue) 7914. A projection optical system 7917 is structured by a plurality of optical lenses provided with projection lenses. The light source optical system and the display portion shown in FIG. 19C may be applied to the light source optical systems and the display portions 7601, 7702 shown in FIGS. 18A and 18B. Further, as a light source optical system 7911, an optical system using a coupling lens and a collimator lens in addition to the light source may be used.

As described above, the application range of the image display portion of the present invention is extremely wide and the present invention may be applied to various fields of electronic device. The electronic device of the present invention can be realized by any combination of Embodiments 1 to 5.

According to the present invention, the number of circuit elements in the signal line driver circuit can be reduced to one n-th in a conventional case with the above structure. Thus, the area of the signal line driver circuit can be greatly reduced, which is effective for miniaturization of the image display device, and there is an effect on reduction in cost of the image display device and improvement of yield. Also, since the position of the pixel having a different gradation in the horizontal direction is changed, even if the frame frequency is not changed, vertical stripes are hard to be visually identified by human eyes.

What is claimed is:

1. An image display device comprising:

a signal line driver circuit;

a controller; and n×k signal lines, wherein n is a natural number which is equal to 2 or more, and k is a natural number which is equal to 2 or more, and wherein:

the controller includes a register;

the signal line driver circuit includes:

k sets of a first memory circuit each connected to the register;

k sets of a second memory circuit each connected to one of the k sets of the first memory circuit;

k sets of D/A converter circuits each connected to one of the k sets of the second memory circuit; and k sets of signal line selection circuits for selecting k signal lines among the n×k signal lines to input an analog video signal; each of the D/A converter circuits is connected to one of the k sets of signal line selection circuits;

each of the k sets of signal line selection circuits is connected to n pieces of the signal lines;

orders for selecting the n×k signal lines are different from each other between successively produced frame periods; and the orders for selecting the n×k signal lines are determined by a selection signal generated in the controller.

2. The image display device according to claim 1, wherein the signal line driver circuit comprises a polysilicon thin film transistor.

3. The image display device according to claim 1, wherein the signal line driver circuit comprises a single crystalline transistor.

4. An electronic equipment using the image display device as claimed in claim 1.

5. An image display device comprising:

a signal line driver circuit;

a controller; and n×k signal lines, wherein n is a natural number which is equal to 2 or more, and k is a natural number which is equal to 2 or more, and wherein:

the controller includes a register;

the signal line driver circuit includes:

k sets of a first memory circuit each connected to the register;

k sets of a second memory circuit each connected to one of the k sets of the first memory circuit;

k sets of D/A converter circuits each connected to one of the k sets of the second memory circuit; and k sets of signal line selection circuits for selecting k signal lines among the n×k signal lines to input an analog video signal;

each of the D/A converter circuits is connected to one of the k sets of signal line selection circuits;

each of the k sets of signal line selection circuits is connected to n pieces of the signal lines;

orders for selecting the n×k signal lines are different from each other between successively produced horizontal scanning periods;

the orders for selecting the n×k signal lines are different from each other between successively produced frame periods; and the orders for selecting the n×k signal lines are determined by a selection signal generated in the controller.

6. The image display device according to claim 5, wherein the signal line driver circuit comprises a polysilicon thin film transistor.

7. The image display device according to claim 5, wherein the signal line driver circuit comprises a single crystalline transistor.

8. An electronic equipment using the image display device as claimed in claim 5.

9. A method of driving an image display device for displaying an image using an analog video signal, comprising:

inputting the analog video signal to k sets of signal line selection circuits during one horizontal scanning period, wherein k is a natural number which is 2 or more; and inputting each of digital video signals from the k sets of signal line selection circuits to n pieces of signal lines connected to each of the k sets of signal line selection circuits in order during the one horizontal scanning period, wherein n is a natural number which is 2 or more, wherein orders for selecting n×k signal lines are different from each other between successively produced two horizontal scanning periods, and wherein the orders for selecting the n×k signal lines are different from each other between successively produced two frame periods.

10. The method of driving an image display device according to claim 9, wherein the order for selecting the n×k signal lines is determined by a selection signal generated in a controller.

11. The method of driving an image display device according to claim 9, wherein the order for selecting the n×k signal lines is determined by a selection signal generated in a controller in accordance with data stored in a register included in the controller.

12. The method of driving an image display device according to claim 9, wherein the order for selecting the n×k signal lines is determined by inputting a selection signal generated in a controller to an analog switch of a signal line driver circuit in accordance with data stored in a register of the controller.

13. The method of driving an image display device according to claim 9, wherein the analog video signal is obtained by conversion of a digital video signal by a D/A converter circuit.

14. A method of driving an image display device for displaying an image using an analog video signal, comprising:

inputting the analog video signal to k sets of signal line selection circuits during one horizontal scanning period, wherein k is a natural number which is 2 or more; and inputting each of digital video signals from the k sets of signal line selection circuits to n pieces of signal lines connected to each of the k sets of signal line selection circuits in order during the one horizontal scanning period, wherein n is a natural number which is 2 or more, wherein orders for selecting the n×k signal lines are different from each other between successively produced two horizontal scanning periods, and wherein the orders for selecting the n×k signal lines are different from each other between successively produced two frame periods.

15. The method of driving an image display device according to claim 14, wherein the order for selecting the n×k signal lines is determined by a selection signal generated in a controller.

16. The method of driving an image display device according to claim 14, wherein the order for selecting the n×k signal lines is determined by a selection signal generated in a controller in accordance with data stored in a register included in the controller.

17. The method of driving an image display device according to claim 14, wherein the order for selecting the n×k signal lines is determined by inputting a selection signal generated in a controller to an analog switch of a signal line driver circuit in accordance with data stored in a register of the controller.

18. The method of driving an image display device according to claim 14, wherein the analog video signal is obtained by conversion of a digital video signal by a D/A converter circuit.

* * * * *